United States Patent
Nakamura et al.

(10) Patent No.: US 12,192,683 B2
(45) Date of Patent: ***Jan. 7, 2025

(54) TELEVISION RECEIVER COUPLED TO A CONNECTION DEVICE

(71) Applicant: SATURN LICENSING LLC, New York, NY (US)

(72) Inventors: Soichiro Nakamura, Kanagawa (JP); Hiroyasu Sato, Tokyo (JP); Shin Yamamoto, Tokyo (JP); Hirotaka Tako, Kanagawa (JP); Keiichi Takahashi, Kanagawa (JP); Ken Yano, Tokyo (JP); Shunsuke Kajiura, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/101,599

(22) Filed: Jan. 26, 2023

(65) Prior Publication Data

US 2023/0247183 A1 Aug. 3, 2023

Related U.S. Application Data

(60) Continuation of application No. 15/923,675, filed on Mar. 16, 2018, now Pat. No. 11,595,624, which is a
(Continued)

(30) Foreign Application Priority Data

Dec. 27, 2011 (JP) .................................. 2011-286215

(51) Int. Cl.
*H04N 7/20* (2006.01)
*G06F 1/16* (2006.01)
(Continued)

(52) U.S. Cl.
CPC ............. *H04N 7/20* (2013.01); *G06F 1/1601* (2013.01); *G06F 1/1632* (2013.01);
(Continued)

(58) Field of Classification Search
CPC ... H04N 7/20; H04N 5/64; H04N 5/44; G06F 1/1601; G06F 1/1632; H01Q 1/2291; H01Q 1/243; H01Q 1/38; H01Q 21/28
See application file for complete search history.

(56) References Cited

U.S. PATENT DOCUMENTS

| 5,440,449 A | 8/1995 | Scheer |
| 5,894,278 A | 4/1999 | Kubo et al. |

(Continued)

FOREIGN PATENT DOCUMENTS

| CN | 200994166 Y | 12/2007 |
| CN | 201114429 Y | 9/2008 |

(Continued)

OTHER PUBLICATIONS

International Search Report from International Publication mailed Mar. 19, 2013—* cited in parent app.
(Continued)

*Primary Examiner* — John W Miller
*Assistant Examiner* — Humam M Satti
(74) *Attorney, Agent, or Firm* — Richard LaPeruta

(57) ABSTRACT

This disclosure relates to a connection device that can provide a new function for an electronic device.
A film antenna receives a wireless signal transmitted by radio, a relay unit relays the received wireless signal to a television receiver, an LED indicator emits light based on a control signal transmitted from the television receiver, a storage case stores the film antenna, the relay unit and a light emitting unit, and a connection member connects the storage case to the television receiver. In addition, in a state of being
(Continued)

connected to the television receiver, in a normal direction to a housing surface having a display unit on a housing of the television receiver, the storage case has a protruding section which further protrudes from the housing surface and stores the film antenna in the protruding section. For example, this disclosure can be applied to a receiving device having a receiving unit which receives the wireless signal.

20 Claims, 29 Drawing Sheets

Related U.S. Application Data division of application No. 14/366,494, filed as application No. PCT/JP2012/083143 on Dec. 20, 2012, now abandoned.

(51) Int. Cl.
| | | |
|---|---|---|
| H01Q 1/22 | (2006.01) | |
| H01Q 1/24 | (2006.01) | |
| H01Q 1/38 | (2006.01) | |
| H01Q 21/28 | (2006.01) | |
| H04N 5/64 | (2006.01) | |

(52) U.S. Cl.
CPC ........... *H01Q 1/2291* (2013.01); *H01Q 1/243* (2013.01); *H01Q 1/38* (2013.01); *H01Q 21/28* (2013.01); *H04N 5/64* (2013.01)

(56) References Cited

U.S. PATENT DOCUMENTS

| | | | |
|---|---|---|---|
| 6,026,119 A | 2/2000 | Funk et al. | |
| 7,833,028 B1 | 11/2010 | Huang et al. | |
| 2003/0133262 A1 | 7/2003 | Minne' | |
| 2004/0017519 A1 | 1/2004 | Sung | |
| 2004/0203732 A1 | 10/2004 | Brusilovsky et al. | |
| 2006/0040713 A1 | 2/2006 | Kim | |
| 2009/0027224 A1 | 1/2009 | Sugamura | |
| 2010/0053063 A1 | 3/2010 | Ishii | |
| 2011/0267298 A1 | 11/2011 | Erhart et al. | |
| 2011/0273632 A1 | 11/2011 | Casey | |
| 2012/0038689 A1 | 2/2012 | Ishii | |
| 2013/0242206 A1 | 5/2013 | Akita et al. | |
| 2014/0354888 A1* | 12/2014 | Nakamura | H01Q 21/28 348/725 |

FOREIGN PATENT DOCUMENTS

| | | |
|---|---|---|
| EP | 2175186 A2 | 4/2010 |
| JP | 2006-005795 A | 1/2006 |
| JP | 2009164686 A | 7/2009 |
| JP | 2010-055025 A | 3/2010 |
| JP | 2010-114735 A | 5/2010 |

OTHER PUBLICATIONS

Extended European Search Report for EP Application No. 12862573.8, dated Jun. 17, 2015—* cited in parent app.
Chinese Office Action and Search Report for Application No. 201280063408.2 dated Nov. 28, 2016—* cited in parent app.
European Office Action for Application No. EP12862573.8 dated Jul. 21, 2017—cited in parent app.
Kilouris et al., "Reverse Path Technologies in Interactive DVB-T Broadcasting", IST Mobile & Wireless Telecommunications Summit 2002, Jun. 17-19, 2002, Thessaloniki, Greece, Univ. Thessaloniki, Thessaloniki, Greece, pp. 292-295, Jun. 17, 2002—cited in parent app.

* cited by examiner

FIG. 42
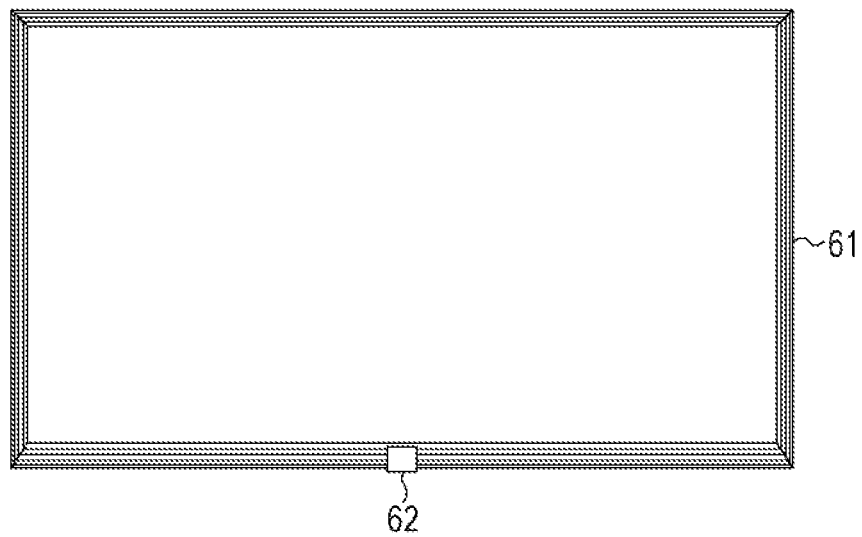
FIG. 43
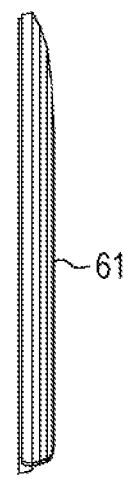
FIG. 44

TELEVISION RECEIVER COUPLED TO A CONNECTION DEVICE

CROSS-REFERENCE TO RELATED APPLICATION

The present application is a continuation application of U.S. patent application Ser. No. 15/923,675, filed Mar. 16, 2018, which is a divisional application of U.S. patent application Ser. No. 14/366,494, filed on Jun. 18, 2014, which is a national phase entry under 35 U.S.C. § 371 of International Application No. PCT/JP2012/083143 filed Dec. 20, 2012, published on Jul. 4, 2013 as WO 2013/099774 A1, which claims priority from Japanese Patent Application No. JP 2011-286215, filed in the Japanese Patent Office on Dec. 27, 2011, the disclosures of which are incorporated by reference herein.

TECHNICAL FIELD

This disclosure relates to a television receiver connection device, and particularly to a television receiver having connection device that can provide a new function for an electronic device connected to a connection device.

BACKGROUND ART

For example, a television receiver having a built-in antenna or integrated circuit (IC) which is used in wireless communication such as wireless fidelity (Wi-Fi) has been proposed (for example, refer to PTL 1). This television receiver is configured to have a wireless communication function.

CITATION LIST

Patent Literature

PTL 1: Japanese Unexamined Patent Application Publication No. 2010-114735

SUMMARY OF INVENTION

Technical Problem

Incidentally, for example, when the television receiver is allowed to have the built-in antenna or IC in the above-described manner to provide the wireless communication function, it is necessary to increase a size of a housing for the television receiver in order to secure a built-in space thereof.

Therefore, in order to avoid an increase in the size of the television receiver, it is desirable to adopt a configuration where the television receiver is not allowed to have the built-in antenna or IC, but for example, a connection device having the built-in antenna or IC is connected to the television receiver so as to be provided with the wireless communication function.

This disclosure is made in view of the above-described circumstances, and aims to provide a new function for an electronic device connected to a connection device.

Solution to Problem

According to an aspect of this disclosure, a connection device that can be connected to an electronic device includes: a receiving unit that receives a wireless signal transmitted by radio; a relay unit that relays the received wireless signal to the electronic device; a light emitting unit that emits light based on a control signal transmitted from the electronic device; a storage unit that stores the receiving unit, the relay unit and the light emitting unit; and a device connection unit that connects the storage unit to the electronic device. In a state of being connected to the electronic device, in a normal direction to a predetermined housing surface on a housing of the electronic device, the storage unit has a protruding section which further protrudes from the housing surface and stores the receiving unit in the protruding section.

The storage unit may have the protruding section which covers a portion of the housing surface.

The connection device may further include a terminal connection part which is connected to a connection terminal, and the storage unit may store the terminal connection part.

The receiving unit may be an antenna for receiving the wireless signal.

The receiving unit may be the antenna formed on a film.

The connection device may further include a plate-shaped member having the antenna, and the storage unit may store the plate-shaped member in a place where the antenna is stored in the protruding section.

The device connection unit may be attachable to and detachable from the electronic device.

The receiving unit may be molded in a state of being included in the protruding section and may have a cutout section which exposes the receiving unit through a portion of the protruding section. A connection portion connected to the relay unit may be positioned in the cutout section and may be in contact with the receiving unit.

The receiving unit may have a plurality of receiving parts receiving different communications, and a blocking unit which blocks radio wave interference may be disposed between the plurality of receiving parts.

An upper surface of the blocking unit may be in contact with a portion of the housing of the electronic device.

The electronic device may be a television receiver having a display unit. In a state of being connected to the television receiver, in a normal direction to the housing surface having the display unit on the housing of the television receiver, the storage unit may have the protruding section which further protrudes from the housing surface and may store the receiving unit in the protruding section.

According to the aspect of this disclosure, the connection device includes a receiving unit that receives a wireless signal transmitted by radio; a relay unit that relays the received wireless signal to the electronic device; a light emitting unit that emits light based on a control signal transmitted from the electronic device; a storage unit that stores the receiving unit, the relay unit and the light emitting unit; and a device connection unit that connects the storage unit to the electronic device. In a state of being connected to the electronic device, in a normal direction to a predetermined housing surface on a housing of the electronic device, the storage unit has a protruding section which further protrudes from the housing surface and stores the receiving unit in the protruding section.

Advantageous Effects of Invention

According to this disclosure, it is possible to provide a new function for an electronic device connected to a connection device.

BRIEF DESCRIPTION OF DRAWINGS

FIG. 42 is a front view of a sixth television receiver.
FIG. 43 is a side view of the sixth television receiver.
FIG. 44 is a top view of the sixth television receiver.

DESCRIPTION OF EMBODIMENTS

Hereinafter, an embodiment according to this disclosure (hereinafter, referred to as an embodiment) will be described. The description will be made in the following order.

1. Overview of This Disclosure
2. Present Embodiment
3. Modification Example

1. Overview of This Disclosure

[Television Receiver 1 in Related Art]

Figure 1:
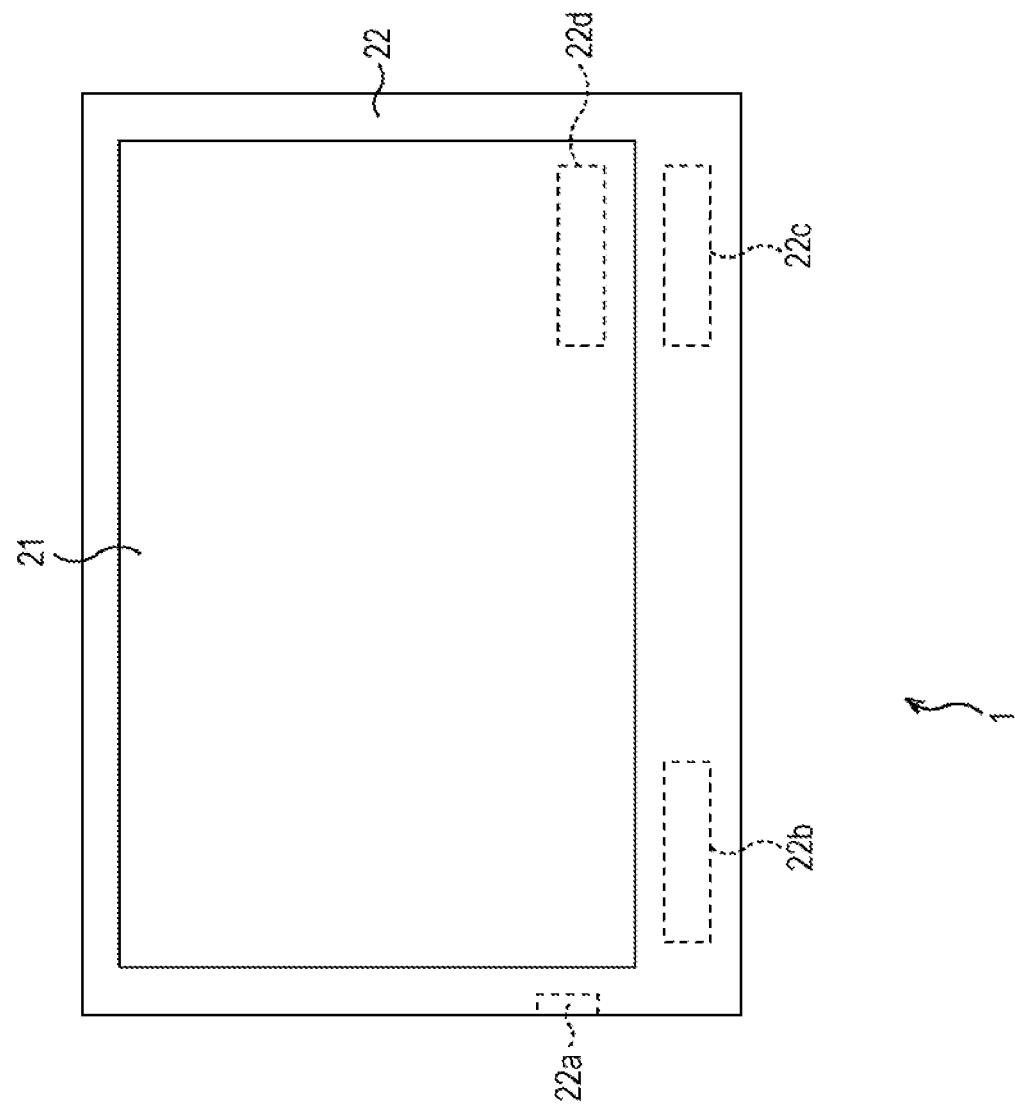
FIG. 1 is a front view of a television receiver in the related art.

FIG. 1 is a front view of a television receiver 1 in the related art.

The television receiver 1 in the related art is mainly configured to have a panel 21 for displaying an image and a frame 22 formed to surround four sides of the panel 21, and performs a process according to an operation signal transmitted from a remote controller (not illustrated) which a user operates, for example.

In addition, a USB terminal connection part 22a for connecting a universal serial bus (USB) terminal, for example, is disposed on a side surface of the left side in the drawing, in a housing of the television receiver 1. Furthermore, for example, in the television receiver 1, a lower side (one side of the lower side in the drawing) of the frame 22 has a light receiving circuit 22b which receives an infrared ray from the remote controller (not illustrated) as the operation signal, a detection circuit 22c which detects ambient brightness, a speaker and the like, all of which are built therein. In addition, a rear surface of the panel 21 has a built-in communication circuit 22d which performs wireless communication using wireless fidelity (Wi-Fi).

For example, this disclosure is made through modularization by separating the USB terminal connection part 22a, the light receiving circuit 22b, the detection circuit 22c and the communication circuit 22d which are included in the television receiver 1 in the related art. A smart unit obtained through the modularization is added (connected) to a predetermined electronic device. In this manner, it is possible to provide a new function for the predetermined electronic device.

Furthermore, for example, soft light is emitted from the smart unit obtained through the modularization so as to surround the smart unit, thereby improving design characteristics (for example, visual beauty).

2. Embodiment

Example of Appearance of Television Receiver 41

Figure 2:
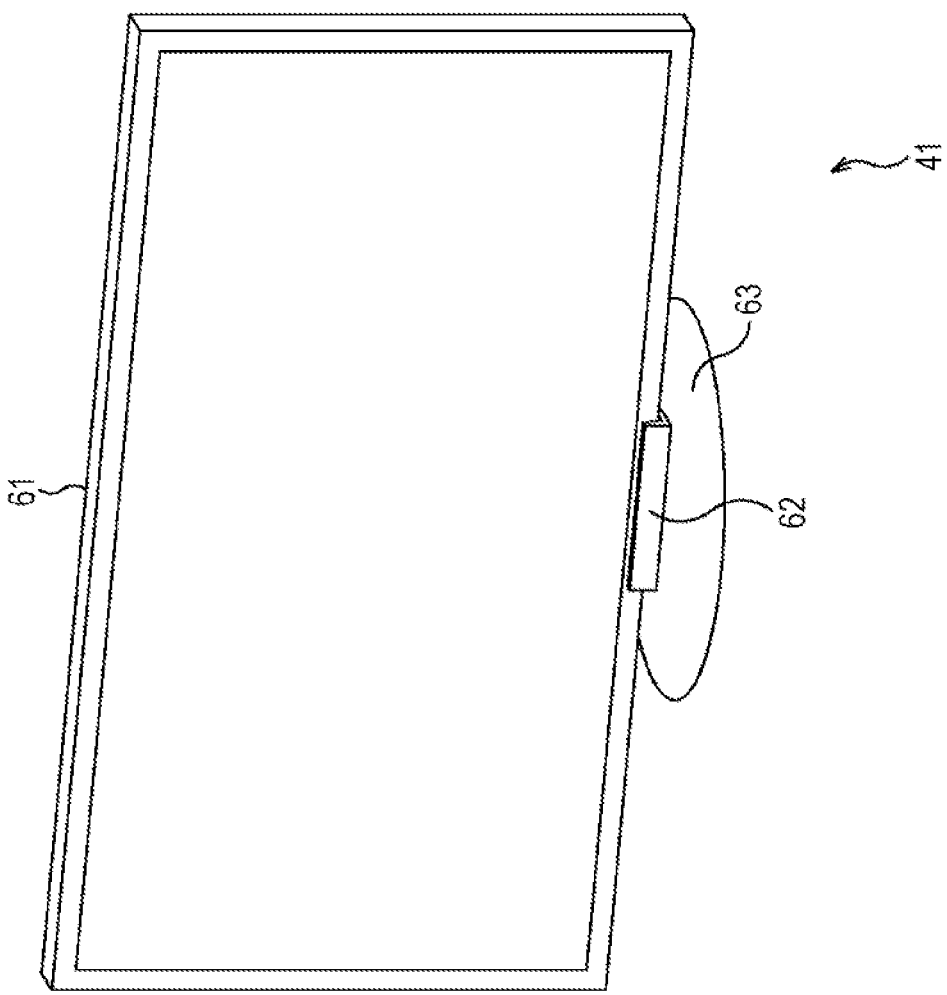
FIG. 2 illustrates an example of appearance of a television receiver according to this disclosure.

Next, FIG. 2 illustrates an example of appearance of a television receiver 41 according to this disclosure.

The television receiver 41 is configured to have a display body 61, a smart unit 62 added (connected) to a lower portion of the display body 61, and a stand 63 supporting the display body 61.

The display body 61 can be configured to be attachable to and detachable from the stand 63. When the display body 61 is configured to be attachable to and detachable from the stand 63, if the display body 61 is detached from the stand 63, the display body 61 to which the smart unit 62 is added can be used as the television receiver 41 for wall mounting.

The display body 61 has a built-in tuner and displays contents such as a broadcasting program received via the tuner. For example, only minimum necessary circuits for receiving and displaying the broadcasting program are mounted on the display body 61 without the light receiving circuit 22b, the detection circuit 22c and the communication circuit 22d being built as illustrated in FIG. 1 therein.

For example, the smart unit 62 has the USB terminal connection part 22a, the light receiving circuit 22b, the detection circuit 22c and the communication circuit 22d as illustrated in FIG. 1, all of which are built therein, and is added to the display body 61.

The smart unit 62 added to the display body 61 functions as a part of the display body 61. That is, the smart unit 62 is added to the display body 61, thereby providing a function included in the smart unit 62 for the display body 61.

In addition, the smart unit 62 is attachable to and detachable from the display body 61. Here, the smart unit 62 obtained through the modularization is described as an example, and a case where the smart unit 62 is attachable to and detachable from the display body 61 is described as an example. However, it does not mean that this technology described below is limited in application to a smart unit. For example, an application scope of this technology is not limited to the case where the smart unit 62 and an electronic device (display body 61) are separately configured, but this technology can also be applied to a case of an integrated configuration.

Furthermore, for example, the smart unit 62 has a built-in light emitting diode (LED) indicator 182 (to be described later using FIG. 7) which emits light in response to a state of the display body 61, and controls light emitting or switching-off of the LED indicator 182 according to a control transmitted from the display body 61.

Here, the description will be continued under a condition that the light emitting or the switching-off of the LED indicator 182 is controlled according to the control transmitted from the display body 61. However, a configuration can be made so that the light emitting or the switching-off of the LED indicator 182 is controlled according to its own control of the smart unit 62.

For example, when the smart unit 62 is configured to be attachable to and detachable from a main body of the display body 61, a configuration can be made so that the light emitting or the switching-off of the LED indicator 182 is controlled by detecting a state of the display body 61 by the smart unit 62 itself, for example, a state where power is turned on and by matching the state thereof. In addition, the smart unit 62 itself may control the light emitting or the switching-off of the LED indicator 182, and may be adapted to function as one of interior items.

In the television receiver 41, the light receiving circuit 22b, the detection circuit 22c and the communication circuit 22d as illustrated in FIG. 1 are not built in the display body 61, and are separated from the display body 61 so as to configure the smart unit 62.

Therefore, since the television receiver 1 in the related art has the light receiving circuit 22b, the detection circuit 22c and the communication circuit 22d which are built therein, the lower side of the frame 22 is increased in width. However, in the television receiver 41, it is possible to prevent the frame from being increased in width. That is, according to this technology, it is possible to realize a narrow frame.

In addition, in the television receiver 41, for example, it is possible to dispose the communication circuit 22d in the smart unit 62.

In the television receiver 1 in the related art illustrated in FIG. 1, the communication circuit 22d is disposed on a rear surface of the panel 21. If the communication circuit 22d is disposed on the rear surface of the panel 21, there is a possibility that the wireless signal transmitted by radio may be blocked by the panel 21. However, according to this technology, it is possible to dispose the communication circuit 22d in the smart unit 62. The smart unit 62 is arranged at a position different from that of the panel, and thus is not affected by the panel. That is, by disposing the communication circuit 22d in the smart unit 62, it is possible to prevent the possibility that the wireless signal transmitted by radio may be blocked by the panel of the display body 61.

Furthermore, the light receiving circuit 22b, the detection circuit 22c and the communication circuit 22d which are disposed in separate places in the television receiver 1 in the related art are integrated in the smart unit 62 in a case of the television receiver 41.

Therefore, a user can easily recognize a position where an infrared rays (IR) receiving unit 173 (to be described later using FIG. 7) which receives (receives light of) an operation signal transmitted from the remote controller is disposed, as a position where the smart unit 62 is arranged.

Accordingly, for example, when operating the remote controller (not illustrated), the user can operate a light emitting portion of the remote controller to be directed to the smart unit 62 so that the operation signal from the remote controller is emitted toward the smart unit 62.

Accordingly, for example, the smart unit 62 of the television receiver 41 can receive (receive the light of) the operation signal transmitted from the remote controller (not illustrated) under better conditions.

In addition, in the television receiver 41, since the smart unit 62 is configured to be attachable to and detachable from the display body 61, the smart unit 62 can be replaced by a smart unit having different functions if necessary.

Therefore, a user who purchases the television receiver 41 replaces the smart unit 62 with another smart unit having more functions, thereby enabling the television receiver 41 to be upgraded.

In addition, when manufacturing the television receiver 41, depending on which function of the smart unit 62 connected to the display body 61 is required, it is possible to manufacture the television receiver 41 having different functions.

Therefore, when manufacturing the television receiver 41, it is possible to manufacture the display body 61 and the smart unit 62 by using different manufacturing lines. Accordingly, as compared to the television receiver 1 in the related art which is manufactured by using the same manufacturing line, it is possible to improve production efficiency of the television receiver 41.

In addition, for example, it is not necessary for the display body 61 to have a built-in IC chip for performing wireless communication. Accordingly, for example, as compared to a case of manufacturing the television receiver 1 in the related art, it is possible to save man-hour during the manufacturing.

Furthermore, the improved production efficiency of the television receiver 41 and the saved man-hour when manufacturing the display body 61 can relatively reduce the manufacturing cost of the television receiver 41. [Example of Appearance of Smart Unit 62]

Next, referring to FIGS. 3 and 6, appearance of the smart unit 62 will be described.

Figure 3:
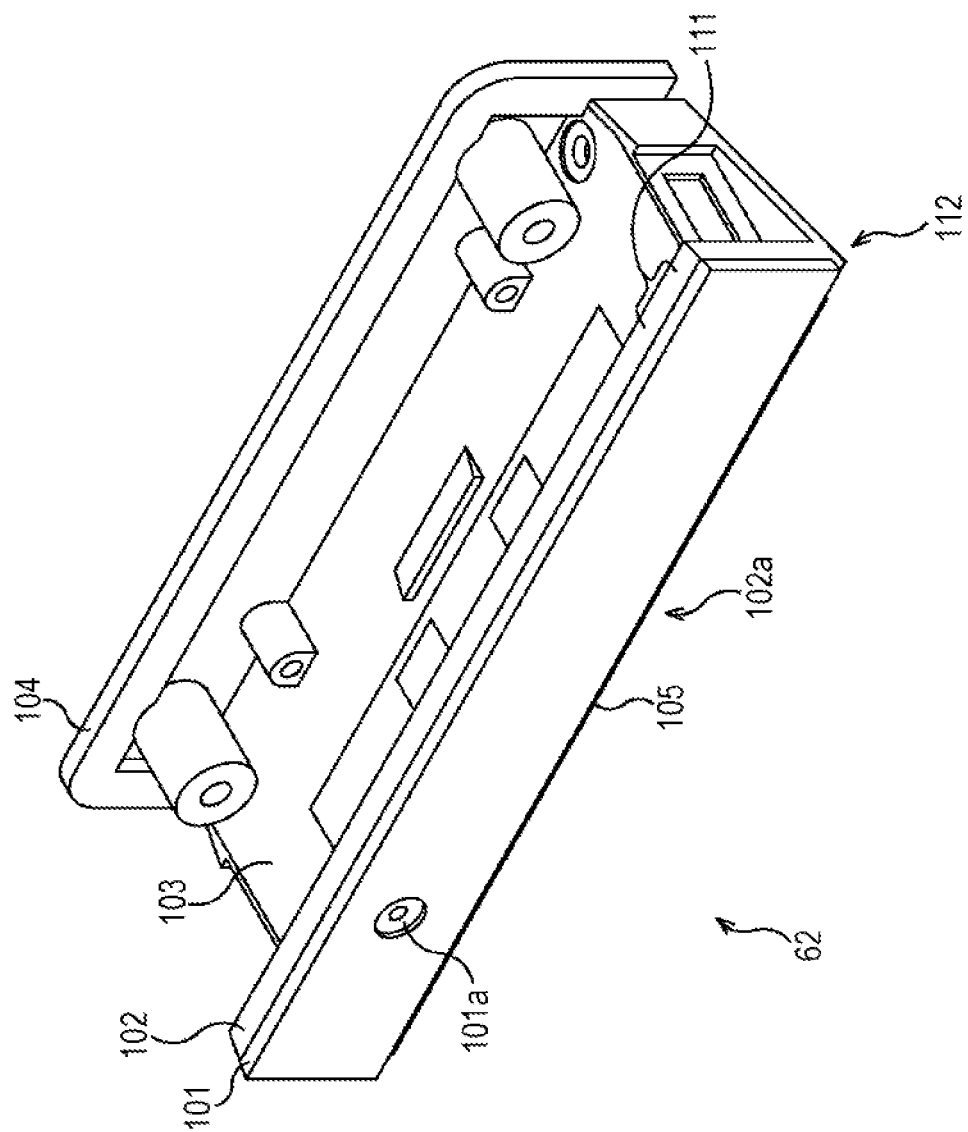
FIG. 3 is a perspective view when a smart unit is viewed from above.
Figure 4:
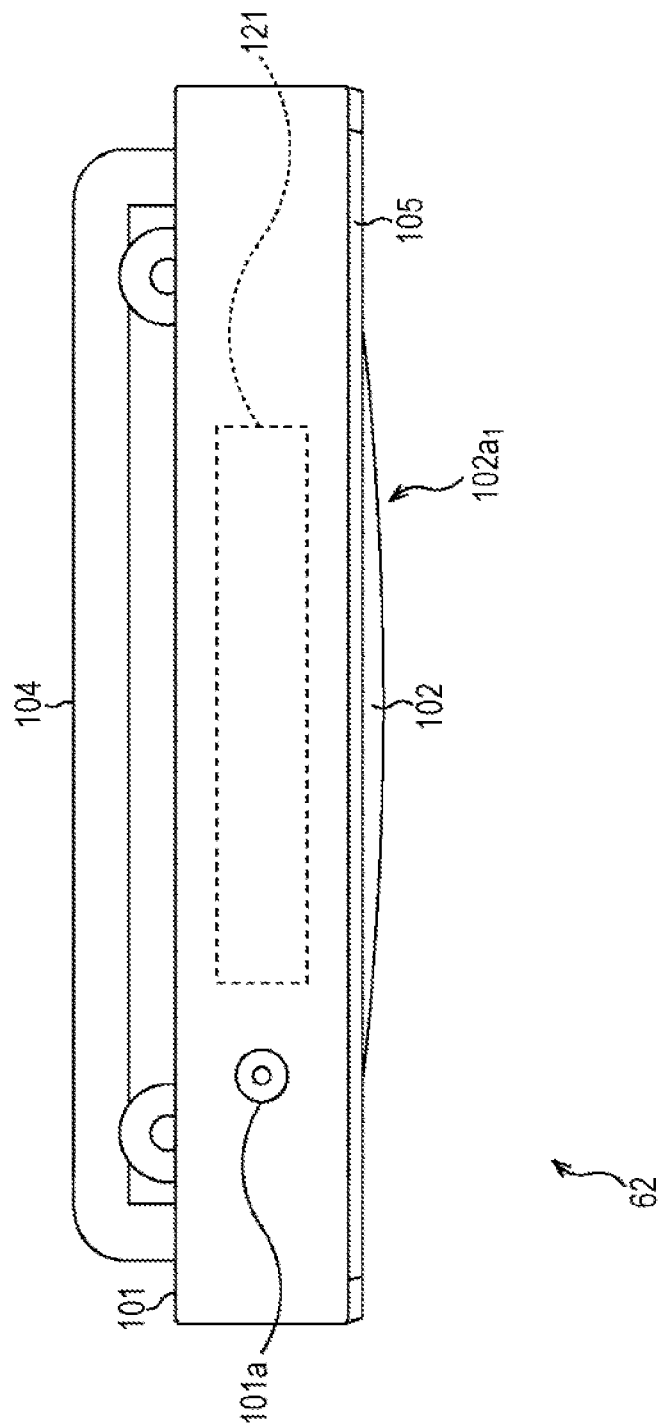
FIG. 4 is a front view of the smart unit.
Figure 5:
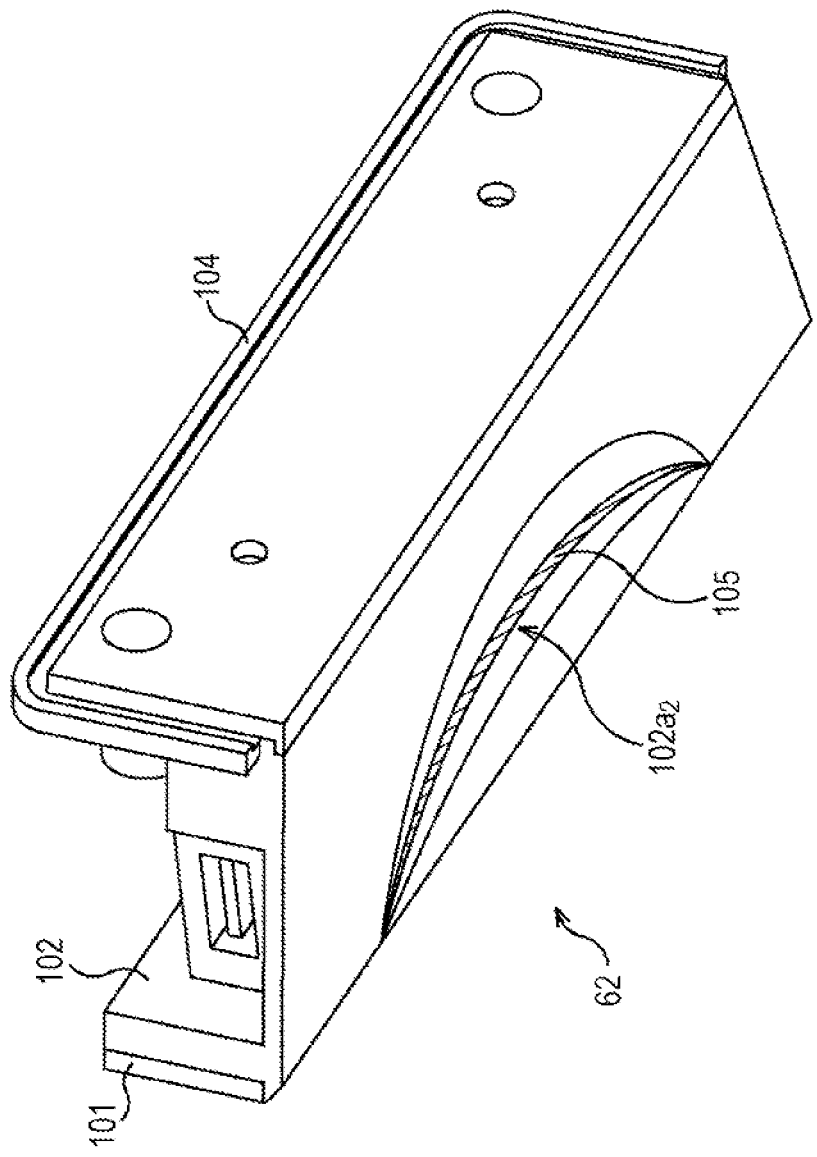
FIG. 5 is a perspective view when the smart unit is viewed from below.

FIG. 3 is a perspective view when a single body of the smart unit 62 is viewed from above in a state where the display body 61 illustrated in FIG. 2 is detached therefrom. FIG. 4 is a front view of the smart unit 62. FIG. 5 is a perspective view when the smart unit 62 is viewed from below. FIG. 6 is a side view when the smart unit is viewed from the right side.

As illustrated in FIG. 3, the smart unit 62 is configured to have a front panel 101, a storage case 102, a connection member 103, a rear cover 104 and a light guide plate 105.

The front panel 101 has a plate shape, and a rear surface of the front panel 101 and a front surface of the storage case 102 are bonded so as to cover the front surface of the storage case 102. Here, the term of the front surface means a surface which is present in a direction to the front panel 101 (leftward and downward direction in FIG. 3). This is the same even for other drawings.

In addition, for example, a film antenna 121 (to be described later using FIG. 4) formed by adding an antenna used in the wireless communication to a film, or a camera board 201 (to be described later using FIG. 8) mainly having a camera is built in between the front panel 101 and the storage case 102.

Therefore, for example, the front panel 101 is configured to have a material which transmits a wireless signal used in the wireless communication (for example, a plastic or a resin film having high transmittance for electromagnetic waves).

The film antenna 121 has a detection electrode functioning as a touch sensor which detects whether a user's hand is approaching or touching, and detects an approaching operation or a touching operation on a right end portion 111 of the storage case 102, and the approaching operation or the touching operation on a lower end portion 112 of the storage case 102 (portion bonded to a bottom side portion of the front panel 101).

Furthermore, for example, an exposure hole 101a for exposing a lens of a camera 175 (refer to FIG. 8) disposed on the camera board 201 is disposed on the surface of the front panel 101 (opposite surface to the surface bonded to the storage case 102).

In addition, for example, the surface of the front panel 101 can be used as a decorative part on which logos or designs of a manufacturer who manufactures the smart unit 62 can be drawn.

For the television receiver 41, the display body 61 and the smart unit 62 can be separately manufactured. For example, when manufacturing the television receiver 41, the smart unit 62 can be mounted on the display body 61 after the relatively small smart unit 62 is decorated.

Therefore, for example, as compared to a case where the frame of relatively large television receiver 1 in the related art is decorated, the television receiver 41 can be more easily decorated.

The storage case 102 has a substantially rectangular parallelepiped shape (details to be described later with reference to FIG. 8), and stores the film antenna 121, microphones 176 and 177, the camera board 201, USB terminal connection parts 180 and 181, a communication board 202 having an IC used in the wireless communication, and the light guide plate 105.

The front surface of the storage case 102 is bonded to the rear surface of the front panel 101 so as to be overlapped with each other. As described above, the film antenna 121 (refer to FIG. 4) and the camera board 201 (refer to FIG. 8) are built in between the storage case 102 and the front panel 101.

In addition, an upper surface of the storage case 102 is covered by the connection member 103, and a rear surface of the storage case 102 is covered by the rear cover 104. Furthermore, both side surfaces of the storage case 102 have a rectangular insertion port, through which a USB terminal can be connected to the USB terminal connection parts 180 and 181 disposed on the communication board 202 from outside.

Here, the description will be continued under a condition that the smart unit 62 and the main body 61 are connected to each other via the USB terminal connection parts 180 and 181, but the connection therebetween may be made by using an interface other than the USB. For example, the smart unit 62 and the main body 61 may be connected to each other by using the interface such as a universal asynchronous receiver transmitter (UART).

In addition, a through hole 102a which is a hole formed from the front surface through the bottom surface of the storage case 102 is disposed in the storage case 102. The through hole 102a is disposed below a portion overlapped with the rear surface of the front panel 101, within the front surface of the storage case 102. The light guide plate 105 is stored in the through hole 102a. Here, description is made in association with the light guide plate, but the shape thereof may be a cylindrical shape without being limited to the plate shape. In addition, a case is also included where the light guide plate 105 is formed by combining a plurality of plate-shaped members.

Furthermore, an opening 102a1 (to be described later using FIG. 4) of the through hole 102a is formed on the front surface of the storage case 102, and an opening 102a2 (to be described later using FIG. 5) of the through hole 102a is formed on the bottom surface of the storage case 102.

The connection member 103 is bonded to the storage case 102 so as to cover the upper surface of the storage case 102. In addition, the surface of the connection member 103 (opposite surface to the surface covering the upper surface of the storage case 102) is formed so that the display body 61 is attachable thereto and detachable therefrom.

The rear cover 104 is bonded so as to be overlapped with the rear surface of the storage case 102.

The light guide plate 105 is stored in the storage case 102 so as to be inserted into the through hole 102a disposed in the storage case 102. In addition, the light guide plate 105 has a concave surface 105a (to be described later using FIG. 8) which is a recess-shaped surface for guiding light emitted from the LED disposed on the communication board 202 stored in the storage case 102 to the opening 102a1 of the front surface side or the opening 102a2 of the bottom surface side.

FIG. 4 is a front view of the smart unit 62, and is a view when the front panel 101 is viewed from front. FIG. 5 is a perspective view when the smart unit 62 is viewed from below. Referring to FIG. 4, the opening 102a1 formed to partially protrude from the lower side of the front panel 101 is disposed on the front surface of the storage case 102.

As illustrated in FIG. 4, the light guide plate 105 is inserted into the opening 102a1 disposed on the front surface of the storage case 102, and is stored in the through hole 102a. That is, the light guide plate 105 is stored in the through hole 102a so as to close the opening 102a1 disposed on the front surface of the storage case 102 and the crescent-shaped opening 102a2 formed in an arc shape on the bottom surface of the storage case 102 as illustrated in FIG. 5.

In addition, as illustrated in FIG. 4, the film antenna 121 is stored by adhering to the rear surface of the front panel 101. The film antenna 121 will be described later in detail with reference to FIGS. 9 and 10.

Figure 6:
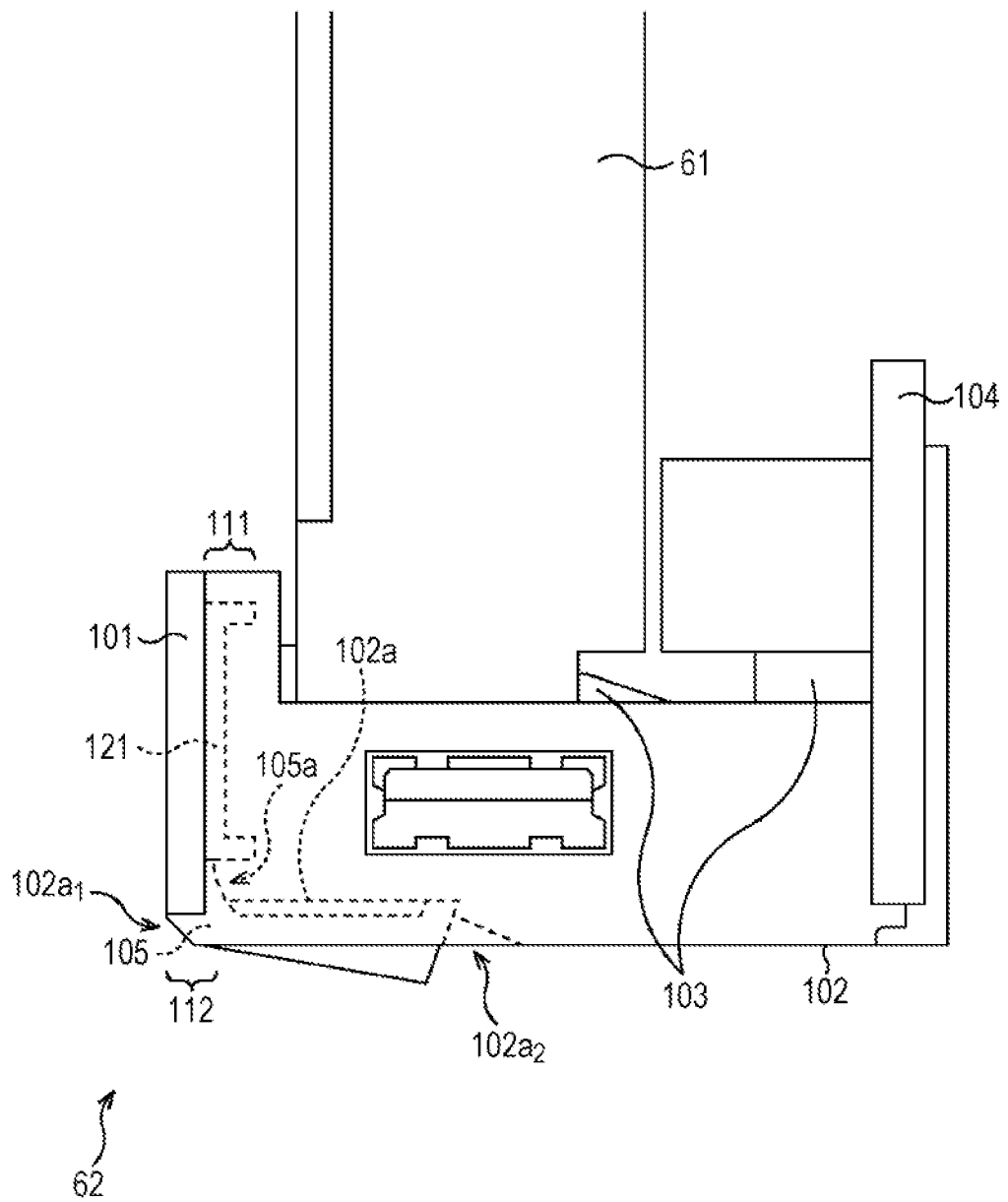
FIG. 6 is a side view when the smart unit is viewed from the right side.

Next, FIG. 6 is a side view when the smart unit 62 illustrated in FIG. 4 is viewed from the right side in FIG. 4.

As illustrated in FIG. 6, the side surface of the storage case 102 has a substantially L-shape. As illustrated in FIG. 6, the storage case 102 stores the light guide plate 105 having the concave surface 105a which is the recess-shaped surface, in the through hole 102a formed from the front surface to the bottom surface of the storage case 102.

In addition, the storage case 102 stores the film antenna 121 on the further front side (left side in the drawing) from a display screen of the display body 61.

That is, for example, the storage case 102 is formed to have a protruding section which further protrudes from the housing surface thereof in a normal direction to the predetermined housing surface within the surface of the housing of the display body 61.

Specifically, for example, the storage case 102 is formed to have a protruding section protruding to the further left side in the drawing from the surface having the display screen of the display body 61 in the normal direction to the surface having the display screen of the display body 61. Then, the film antenna 121 is stored in the protruding section of the storage case 102. For example, as illustrated in FIG. 6, the protruding section of the storage case 102 is formed so as to cover a portion of the surface having the display screen of the display body 61.

Therefore, the wireless signal is not blocked by the influence of the display body 61 (metal or the like included in the display body 61). Thus, the smart unit 62 can perform the wireless communication.

The storage case 102 is manufactured in a state where it is determined in advance that the protruding section of the storage case 102 is to protrude to any surface of the housing of the display body 61.

In this case, in FIG. 6, it is assumed that a user is present in a direction where the surface having the display screen of the display body 61 is present, that is, in the leftward direction in the drawing. Then, it is assumed that the user performs the wireless communication with the smart unit 62 by using a portable communication device.

Therefore, the storage case 102 is formed so that the protruding section of the storage case 102 protrudes to the surface having the display screen of the display body 61.

In addition, the camera board 201 is also stored in the protruding section of the storage case 102. An IR light receiving unit 173 (to be described later using FIG. 7) which receives (receives light of) the operation signal as an infrared ray emitted from the remote controller (not illustrated) is disposed on the camera board 201.

Therefore, in the smart unit 62, in addition to the wireless signal, the operation signal is not blocked in the same manner. It is possible to receive the operation signal without the operation signal as the wireless signal being blocked by the display body 61.

[Functional Block Diagram of Television Receiver 41]

Figure 7:
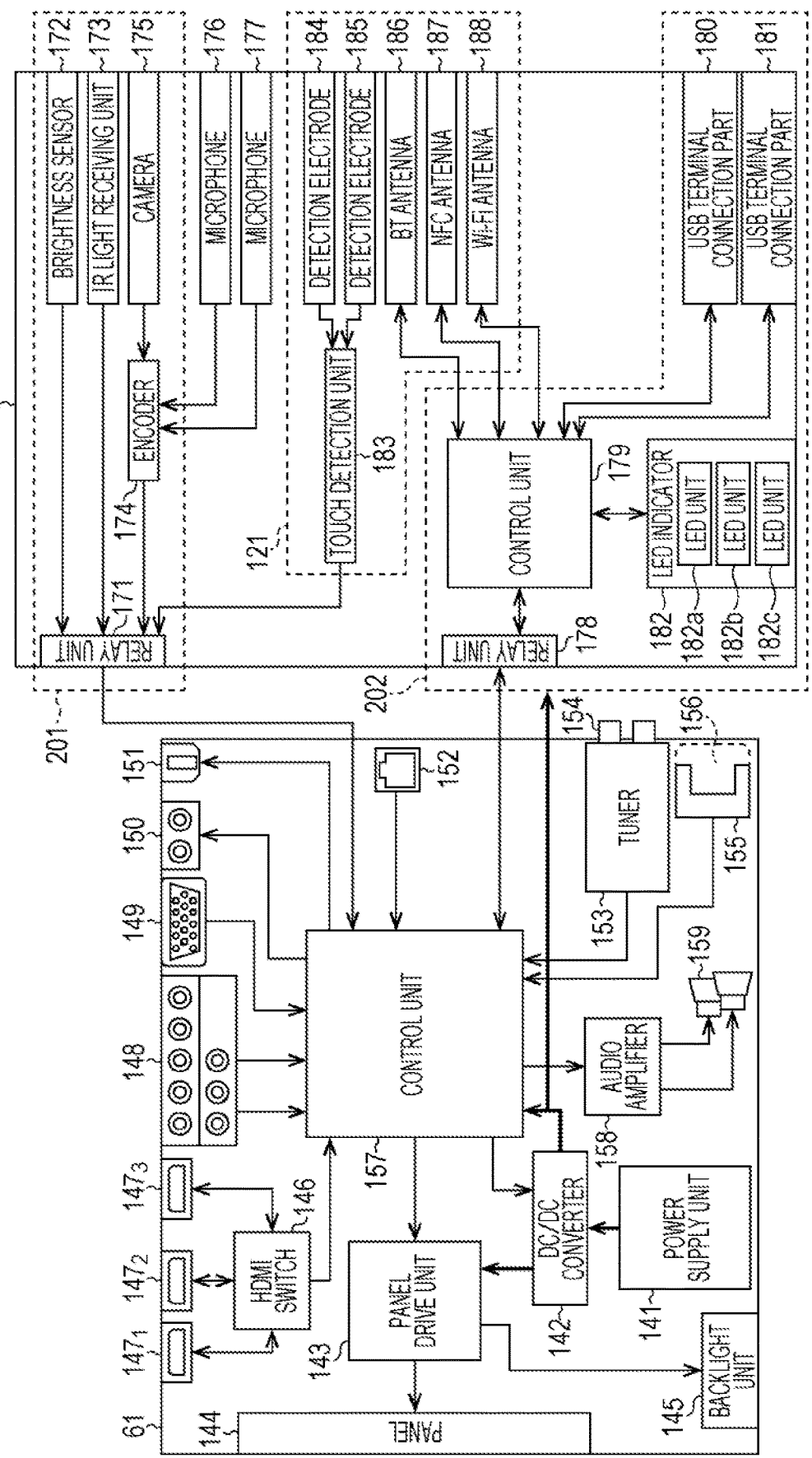
FIG. 7 is a block diagram illustrating an example of a functional configuration of the television receiver in FIG. 2.

Next, FIG. 7 illustrates an example of a functional configuration of the television receiver 41.

The display body 61 and the smart unit 62 are electrically connected to each other.

The display body 61 is configured to include a power supply unit 141, a DC/DC converter 142, a panel drive unit 143, a panel 144, a backlight unit 145, a high-definition multimedia interface (HDMI) switch 146, HDMI terminals 1471 to 1473, an analog AV input terminal 148, a PC input terminal 149, an analog audio output terminal 150, an optical digital audio output terminal 151, a LAN terminal 152, a tuner 153, an antenna terminal 154, a CAS card I/F 155, a B-CAS (registered trademark) card 156, a control unit 157, an audio amplifier 158 and a speaker 159.

The power supply unit 141 is connected to external AC power supply, converts the received AC power supply into DC power supply having a predetermined voltage, and supplies the DC power to the DC/DC converter 142. The DC/DC converter 142 converts a first power supply voltage supplied from the power supply unit 141 into a second power supply voltage, and supplies the second power supply voltage to the respective units such as the panel drive unit 143, the control unit 157 and the smart unit 62. The power supply voltages supplied to the respective units may be different from or the same as each other.

Based on an image signal supplied from the control unit 157, the panel drive unit 143 drives the panel 144 and the backlight unit 145 to display an image. The backlight unit 145 is arranged on a rear surface side of the panel 144. The panel 144 and the backlight unit 145 configure a liquid crystal display (LCD). Based on a drive control of the panel drive unit 143, the panel 144 controls an opening of a liquid crystal of each pixel. Based on the drive control of the panel drive unit 143, the backlight unit 145 emits light with predetermined brightness.

Based on the control signal transmitted from the control unit 157, the HDMI switch 146 appropriately switches the HDMI terminals 1471 to 1473, and performs relay of a HDMI signal exchanged between an external device connected to the HDMI terminals 1471 to 1473 and the control unit 157. The respective HDMI terminals 1471 to 1473 exchange the HDMI signal with the external device which is connected to each terminal.

The analog AV input terminal 148 inputs an analog audio and visual signal (AV signal) transmitted from the external device, and supplies the AV signal to the control unit 157.

For example, the PC input terminal 149 is configured to have a mini D-Sub 15 pin terminal, inputs an analog image signal out of the AV signals output by a personal computer, and supplies the image signal to the control unit 157.

The analog audio output terminal 150 outputs an analog audio signal supplied from the control unit 157, to the connected external device. The optical digital audio output terminal 151 outputs an audio optical digital signal supplied from the control unit 157, to the connected external device.

For example, the LAN terminal 152 is configured to have a 10BASE-T/100BASE-TX connector, and is connected to a predetermined network such as a home network and the Internet.

The tuner 153 is connected to an antenna (not illustrated) via the antenna terminal 154, acquires a broadcast signal having a predetermined channel from radio waves received by the antenna, and supplies the broadcast signal to the control unit 157. In the present embodiment, for example, the radio wave received by the tuner 153 is to be a broadcast signal of digital terrestrial broadcasting.

The B-CAS (registered trademark) card 156 storing an encryption key for descrambling the broadcast signal in the digital terrestrial broadcasting is inserted into the CAS card I/F 155. The CAS card I/F 155 reads out the encryption key stored in the B-CAS (registered trademark) card 156, and supplies the encryption key to the control unit 157.

The control unit 157 performs an overall control on the television receiver 41. For example, the control unit 157 performs an analog to digital (A/D) conversion process for the image signal and the audio signal, a digital to analog (D/A) conversion process, descrambling process for the broadcast signal, and a decoding process. In addition, the control unit 157 performs the control based on a brightness signal, an IR signal, a touch sensor signal and a universal serial bus (USB) I/F signal which are transmitted from the smart unit 62 (to be described later), and also performs an LED control of the light emitting diode (LED) indicator 182. The control unit 157 can be configured to have a single chip (SoC: system on a chip).

The audio amplifier 158 amplifies the analog audio signal supplied from the control unit 157 and supplies the signal to the speaker 159. The speaker 159 outputs the audio according to the analog audio signal transmitted from the audio amplifier 158.

Next, a configuration of the smart unit 62 of the television receiver 41 will be described.

The camera board 201, the communication board 202 and the film antenna 121 are mainly stored in the storage case 102 of the smart unit 62.

The camera board 201 has a relay unit 171, a brightness sensor 172, an IR light receiving unit 173, an encoder 174 and the camera 175. In addition, the storage case 102 stores the microphone 176 and the microphone 177 so as to interpose the camera board 201 therebetween.

The brightness signal, the IR signal, the USB I/F signal and the touch sensor signal (to be described later) are exchanged between the control unit 157 of the display body 61 and the smart unit 62 via the relay unit 171.

The brightness sensor 172 detects brightness around the television receiver 41 (for example, brightness in a room where the television receiver 41 is installed), and supplies a detection result thereof to the control unit 157 via the relay unit 171 as the brightness signal.

For example, when a user operates the remote controller (not illustrated), the IR light receiving unit 173 receives the light of the IR signal corresponding to the user's operation which is emitted from the remote controller, and supplies the IR signal to the control unit 157 via the relay unit 171.

The camera 175, the microphone 176 and the microphone 177 are connected to the encoder 174. The camera 175 is configured to have image sensing devices such as a charge coupled device (CCD) and a complementary metal oxide semiconductor (CMOS) image sensor, and supplies the image signal obtained by imaging to the encoder 174. The microphone 176 and the microphone 177 respectively supply the audio signal obtained by collecting the sound to the encoder 174. The encoder 174 performs a signal process such as the A/D conversion process for the image signal and the audio signal and the encoding process, converts the processed signal into the USB I/F signal, and supplies the USB I/F signal to the control unit 157 via the relay unit 171.

The communication board 202 has a relay unit 178, a control unit 179, the USB terminal connection part 180, the USB terminal connection part 181 and the LED indicator 182.

The power supplied from the display body 61 is supplied to each unit of the smart unit 62 via the relay unit 178. In addition, the LED control signal and the USB I/F signal (to be described later) are also exchanged between the control unit 157 of the display body 61 and the smart unit 62 via the relay unit 178.

The relay unit 178 outputs the USB I/F signal in conformity to a USB standard which is supplied from the control unit 179, to the control unit 157. In addition, the relay unit 178 supplies the USB I/F signal or the LED control signal transmitted from the control unit 157, to the control unit 179.

The control unit 179 is connected to the relay unit 178, the USB terminal connection part 180, the USB terminal connection part 181, the LED indicator 182, a Bluetooth (registered trademark: BT) antenna 186, a near field communication (NFC) antenna 187 and a Wi-Fi antenna 188.

The control unit 179 supplies data supplied from the relay unit 178 as the USB I/F signal, to the BT antenna 186, and transmits the data to a communication device such as a mobile phone (a so-called smart phone) for example, by the wireless communication using Bluetooth (registered trademark). In addition, the control unit 179 receives the data transmitted from the communication device by the wireless communication using the Bluetooth (registered trademark) via the BT antenna 186, converts the data into the USB I/F signal, and supplies the USB I/F signal to the control unit 157 via the relay unit 178.

The control unit 179 supplies the data supplied from the relay unit 178 as the USB I/F signal, to the NFC antenna 187, and transmits the data to the communication device such as the mobile phone for example, by non-contact proximity wireless communication using NFC. In addition, the control unit 179 receives the data transmitted from the communication device by the non-contact proximity wireless communication using the NFC, via the NFC antenna 187, converts the data into the USB I/F signal, and supplies the USB I/F signal to the control unit 157 via the relay unit 178.

The control unit 179 supplies the data supplied from the relay unit 178 as the USB I/F signal, to the Wi-Fi antenna 188, and transmits the USB I/F signal to the communication device such as the mobile phone for example, by the wireless communication using Wi-Fi. In addition, the control unit 179 receives the data transmitted from the communication device by the wireless communication using the Wi-Fi, via the Wi-Fi antenna 188, converts the data into the USB I/F signal, and supplies USB I/F signal to the control unit 157 via the relay unit 178.

The USB terminal connection part 180 and the USB terminal connection part 181 are connectors to which the USB terminal is connected. For example, a USB memory or a hard disk storage device as an external storage device is connected to the USB terminal connection part 180 or the USB terminal connection part 181. Both of the USB terminal connection part 180 and the USB terminal connection part 181 are disposed so as to oppose the side surface of the housing of the smart unit 62.

For example, the LED indicator 182 has built-in LED units 182a to 182c, and turns on or off the LED units 182a to 182c based on the LED control signal supplied from the control unit 157 via the relay unit 178 and the control unit 179.

The LED units 182a to 182c are configured to respectively have an LED which emits red light, an LED which emits green light and an LED which emits blue light. In the present embodiment, the LED unit 182a is adapted to emit only single color light (for example, white color). Therefore, for example, the LED unit 182a may be configured to have an LED which emits white light. In the present embodiment, the description is made under a condition that the LED unit 182a is configured to have only the LED which emits the white light.

The film antenna 121 has the touch detection unit 183, the detection electrode 184, the detection electrode 185, the BT antenna 186, the NFC antenna 187 and the Wi-Fi antenna 188.

The touch detection unit 183 is connected to the detection electrode 184 and the detection electrode 185. Based on a change in electrostatic capacitance which is caused by the detection electrode 184, the touch detection unit 183 detects a user's approaching operation or touching operation with respect to the right end portion 111 of the smart unit 62, and supplies the detection result thereof to the control unit 157 via the relay unit 171 as a touch sensor signal.

In addition, based on a change in electrostatic capacitance which is caused by the detection electrode 185, the touch detection unit 183 detects the user's approaching operation or touching operation with respect to the lower end portion 112 of the smart unit 62, and supplies the detection result thereof to the control unit 157 via the relay unit 171 as the touch sensor signal.

The detection electrode 184 and the detection electrode 185 are electrodes whose electrostatic capacitance is changed in response to the approach of a human finger or the like.

The detection electrode 184 is built in the housing of the smart unit 62 (rear side of the right end portion 111 of the smart unit 62). The detection electrode 184 is used for detecting an operation of switching a state of the power source in the television receiver 41 over to either an on-state or an off-state, as the user's approaching operation or touching operation with respect to the right end portion 111.

In addition, the detection electrode 185 is built in the housing of the smart unit 62 (rear side of the lower end portion 112 of the smart unit 62). The detection electrode 185 is used for detecting an operation of adjusting a sound volume of the television receiver 41 for example, as the user's approaching operation or touching operation with respect to the lower end portion 112.

The BT antenna 186 is an antenna used in the communication device such as the mobile phone for example, when performing the wireless communication using Bluetooth (registered trademark). The NFC antenna 187 is an antenna used in the communication device when performing the non-contact proximity wireless communication using the NFC. The Wi-Fi antenna 188 is an antenna used in the communication device when performing the wireless communication using the Wi-Fi.

[Internal Configuration of Smart Unit 62]

Figure 8:
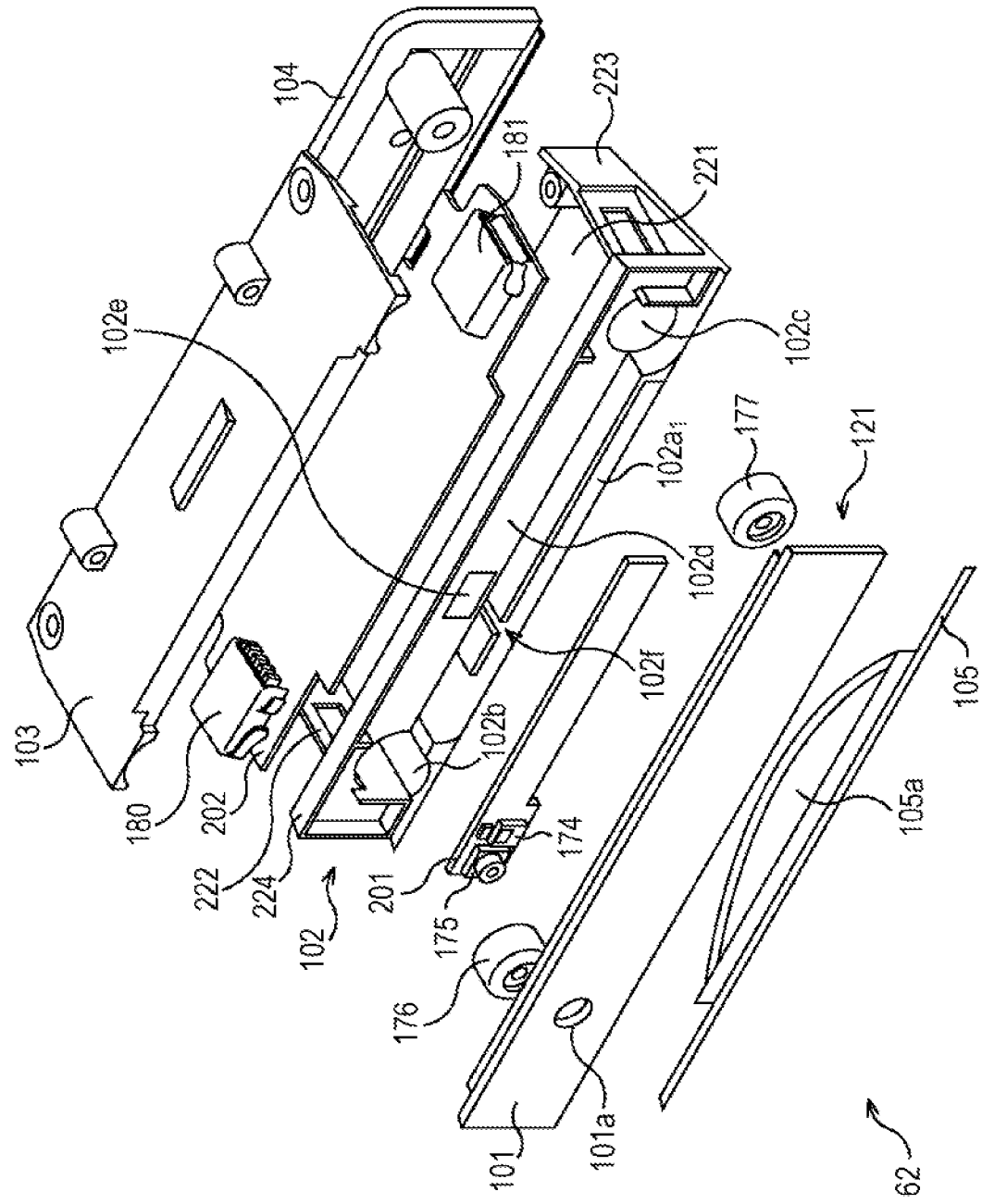
FIG. 8 illustrates an example of an internal configuration of the smart unit.

Next, referring to FIG. 8, a detailed configuration of the storage case 102 of the smart unit 62 will be mainly described. FIG. 8 illustrates an example of an internal configuration of the smart unit 62.

The storage case 102 is formed to have a bottom surface 221, a side surface 222, a side surface 223 and a front surface 224.

The bottom surface 221 stores the communication board 202 having the USB terminal connection parts 180 and 181. In order to prevent the drawing from being complicated, only the USB terminal connection parts 180 and 181 are illustrated on the surface of the communication board 202. For example, an IC or the like which functions as the control unit 179 is disposed between the USB terminal connection parts 180 and 181.

The side surface 222 and the side surface 223 are respectively disposed in a horizontal direction to the bottom surface 221 in the drawing, so as to surround a bottom face of the bottom surface 221.

The side surface 222 has a rectangular insertion port for connecting a USB memory to the USB terminal connection part 180, and a connection portion of the USB terminal connection part 180 is visible from outside of the housing of the smart unit 62 through the insertion port of the side surface 222.

In addition, the side surface 223 has a rectangular insertion port for connecting the USB memory to the USB terminal connection part 181, and a connection portion of the USB terminal connection part 181 is visible from outside of the housing of the smart unit 62 through the insertion port of the side surface 223.

The side surface 222 and the side surface 223 support the connection member 103. In addition, the side surface 222 and the side surface 223 are bonded to the rear cover 104. This causes the communication board 202 to be stored in a state of being surrounded with the bottom surface 221, the side surface 222, the side surface 223, the front surface 224, the connection member 103 and the rear cover 104.

The front surface 224 is disposed in front of the bottom surface 221 (direction where the front panel 101 is present) so as to surround the bottom face of the bottom surface 221. A height of the front surface 224 is higher than a height of the side surface 222 and the side surface 223. Therefore, for example, a shape when the storage case 102 is viewed from the side surface 223 side is an L-shape as illustrated in FIG. 6.

In addition, the rectangular opening 102a1 is disposed on the front surface 224. The light guide plate 105 is inserted into and stored in the opening 102a1.

Furthermore, the front surface 224 has a cylindrical portion 102b and a cylindrical portion 102c respectively formed on the left end side and the right end side in the drawing. The microphone 176 is stored in the cylindrical portion 102b, and the microphone 177 is stored in the cylindrical portion 102c, respectively.

In addition, the front surface 224 has a recess 102d on an upper side of the opening 102a1 between the cylindrical portion 102b and the cylindrical portion 102c. The camera board 201 is arranged and stored in the recess 102d.

In addition, the recess 102d has a hole 102e for passing a signal line which electrically connects the BT antenna 186, the NFC antenna 187 and the Wi-Fi antenna 188 which are disposed in the film antenna 121 (refer to all in FIG. 9) with the control unit 179 (not illustrated) on the communication board 202. Furthermore, the recess 102d has a groove 102f for arranging a signal line 121a (to be described later using FIG. 9) which electrically connects the camera board 201 with the touch detection unit 183 disposed in the film antenna 121.

In the camera board 201, the encoder 174 and the camera 175 are disposed on a surface opposing the front panel 101. In addition, in order to prevent the drawing from being complicated, only the encoder 174 and the camera 175 are illustrated on the camera board 201, and thus the brightness sensor 172, the IR light receiving unit 173 and the like are omitted in the illustration.

In the camera board 201, for example, the surface opposing the front panel 101 has the brightness sensor 172 and the IR light receiving unit 173 which are disposed so that light receiving surfaces thereof are directed toward the front panel 101 side. In addition, for example, in the camera board 201, the relay unit 171 is disposed on the rear side of the surface opposing the front panel 101.

Furthermore, the light guide plate 105 has a concave surface 105a, and as illustrated in FIG. 8, a bottom face of the concave surface 105a is a plate-shaped member formed in a semicircular shape.

The storage case 102 stores the light guide plate 105 in a state where a linear-shaped section formed in a portion corresponding to a chord of a semicircle, within the semicircular bottom face of the concave surface 105a, is exposed through the opening 102a1 disposed in the lower portion of the front panel 101, as illustrated in FIG. 4.

In addition, the storage case 102 stores the light guide plate 105 in a state where a portion formed in the portion corresponding to the chord of the semicircle, within the semicircular bottom face of the concave surface 105a, is exposed through the opening 102a2 disposed in the bottom face (bottom surface 221 in FIG. 8) of the storage case 102, as illustrated in FIG. 5.

[Details of Film Antenna 121]

Figure 9:
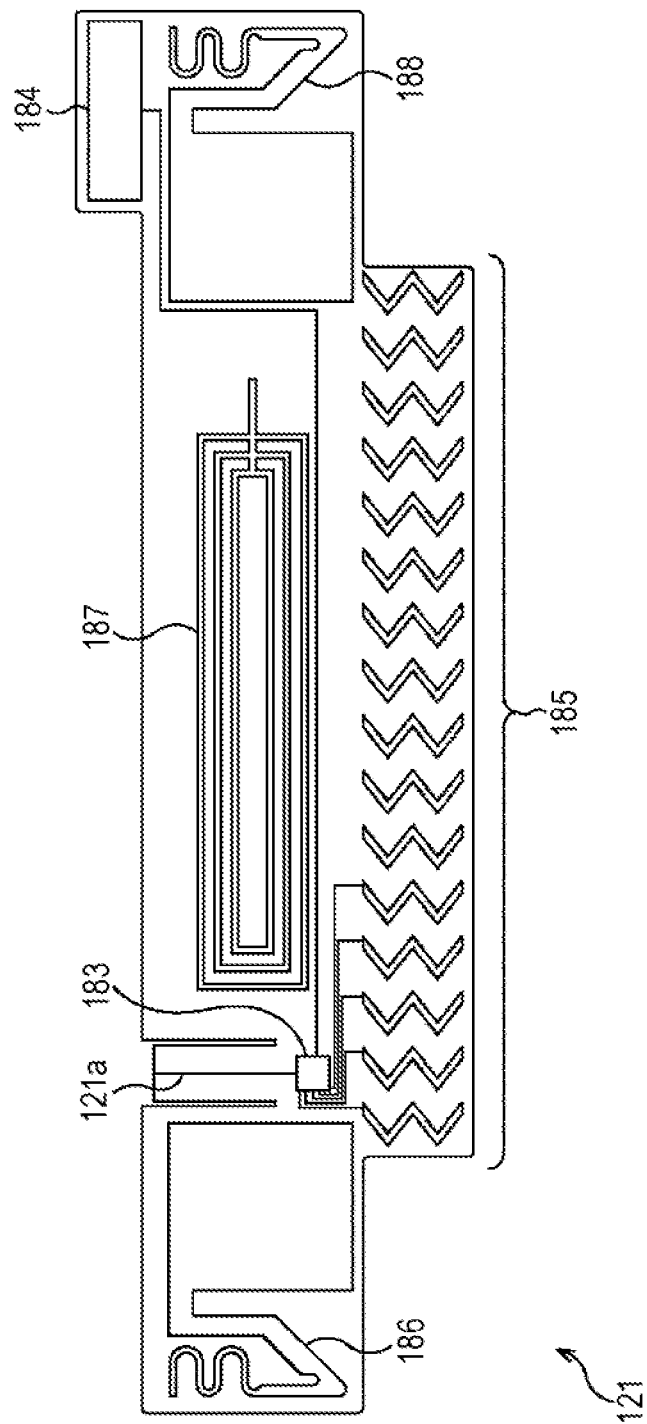
FIG. 9 illustrates an example of a detailed configuration of a film antenna.

Next, FIG. 9 illustrates an example of a detailed configuration of the film antenna 121 added to the rear side of the front panel 101.

As illustrated in FIG. 9, for example, the film antenna 121 is configured so that the touch detection unit 183, the detection electrode 184, the detection electrode 185, the BT antenna 186, the NFC antenna 187 and the Wi-Fi antenna 188 which serve as the IC are arranged on a film. The film on which the touch detection unit 183 and the like are arranged can employ a film formed of PET (polyethylene terephthalate), a polyimide film or the like.

In addition, the touch detection unit 183 is connected to the detection electrode 184 and the detection electrode 185, and is also connected to the signal line 121a for outputting the detection result based on the change in the electrostatic capacitance of the detection electrode 184 and the detection electrode 185. In FIG. 9, in order to prevent the drawing from being complicated, the signal line connecting the touch detection unit 183 and the detection electrode 185 is partially omitted in the illustration.

In addition, in the film antenna 121, as illustrated in FIG. 9, the BT antenna 186 and the Wi-Fi antenna 188 are separately arranged as much as possible. This can prevent a situation where interference occurs between the wireless communication using Bluetooth (registered trademark) and the wireless communication using the Wi-Fi.

As described below, a member for blocking radio wave interference, such as a gasket, is disposed between the BT antenna 186 and the Wi-Fi antenna 188. In this manner, it is possible to adopt a configuration which can further prevent the situation where the interference occurs between the wireless communication using Bluetooth (registered trademark) and the wireless communication using the Wi-Fi.

Furthermore, one side of the signal line 121a on the film antenna 121 is connected to the touch detection unit 183, and the other side is connected to the IC (relay unit 171) on the camera board 201. The signal line 121a is arranged in the groove 102f of FIG. 8 to be connected to the IC on the camera board 201. A relationship between the camera board 201 and the signal line 121a will be described in detail with reference to FIG. 10.

Incidentally, as illustrated in FIG. 9, the touch detection unit 183 is arranged in the film antenna 121. However, for example, the touch detection unit 183 may be disposed on the camera board 201.

However, in this case, it is necessary that the number of signal lines connecting the detection electrodes 184 and 185 on the film antenna 121 with the touch detection unit 183 on the camera board 201 is set to be the same as the total number of the detection electrodes 184 and 185.

Therefore, it is desirable that the touch detection unit 183 be arranged on the film antenna 121 and a single signal line serving as the signal line 121a be connected to the camera board 201.

Figure 10:
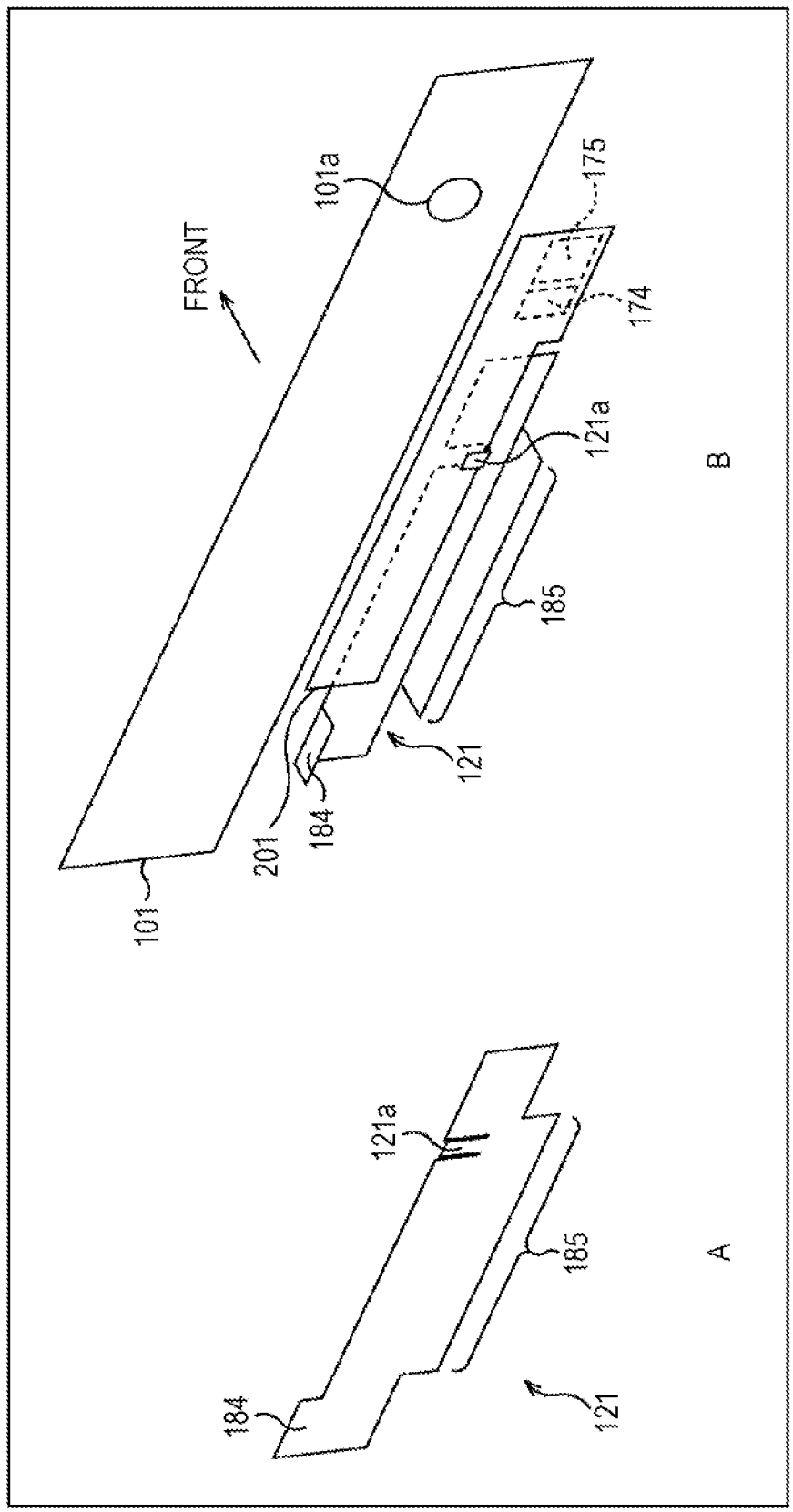
FIG. 10 illustrates an example of appearance of the film antenna.

Next, referring to FIG. 10, an example of appearance when the film antenna 121 is arranged between the front panel 101 and the camera board 201 is illustrated.

"A" of FIG. 10 illustrates an example when the film antenna 121 of FIG. 9 is viewed from the opposite side (rear side of the drawing in FIG. 9).

"B" of FIG. 10 illustrates an example when the film antenna 121 is arranged between the front panel 101 and the camera board 201.

The film antenna 121 is deformed from a state illustrated by "A" of FIG. 10 to a state illustrated by "B" of FIG. 10. That is, as illustrated by "B" of FIG. 10, the film antenna 121 is bent so that the detection electrode 184 is directed to the upper side in "B" of FIG. 10, the detection electrode 185 is directed to the lower side in "B" of FIG. 10 and the signal line 121a can be connected to the relay unit 171 disposed on the rear side of the camera board 201.

Then, the film antenna 121 is arranged between the front panel 101 and the camera board 201 in the deformed state illustrated by "B" of FIG. 10.

Here, connection between the film antenna 121 and the control unit 179 will be additionally described. As described with reference to FIG. 8, the configuration has been described where the BT antenna 186, the NFC antenna 187 and the Wi-Fi antenna 188 which are disposed in the film antenna 121 (refer to all in FIG. 9) are electrically connected to the IC functioning as the control unit 179 of the communication infrastructure 202 by a signal line arranged via the hole 102e.

Figure 11:
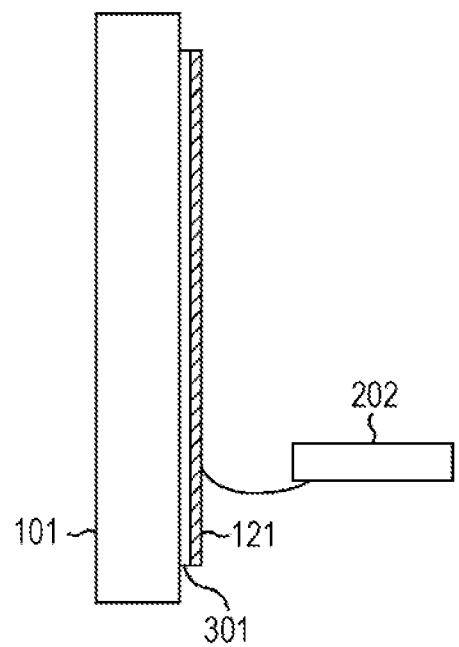
FIG. 11 is a view for describing connection between the film antenna and communication infrastructure.

In this case, as illustrated in FIG. 11, when the front panel 101 is laterally viewed, the front panel 101 and the film antenna 121 are bonded to each other using a double-sided tape 301, for example. Then, the signal line from the film antenna 121 is inserted into the hole 102e disposed in the storage case 102, and is connected to the control unit 179 of the communication infrastructure 202 stored in the storage case 102.

In this manner, it is possible to configure the film antenna 121 to be connected to the communication infrastructure 202 via the signal line. However, if the film antenna is connected to the communication infrastructure 202 by inserting the signal line into the hole 102e and soldering the signal line inserted into the hole 102e, there is a possibility that it may take labor and time during the manufacturing process.

Figure 12:
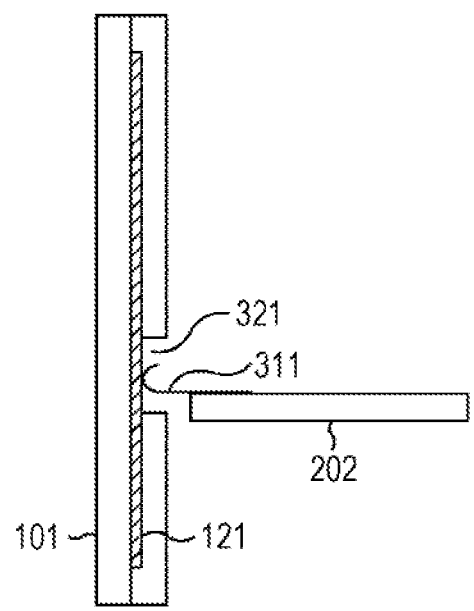
FIG. 12 is a view for describing the connection between the film antenna and the communication infrastructure.

Therefore, instead of the signal line, a configuration may be made for the connection by using a spring, for example. Referring to FIG. 12, a contact portion 311 is disposed in the communication infrastructure 202. The contact portion 311 is fixed to the communication infrastructure 202 by the soldering or the like and is connected to the control unit 179 (not illustrated in FIG. 12).

In addition, the film antenna 121 is molded in a state of being included in the front panel 101. A cutout section 321 is formed on the communication infrastructure 202 side within the front panel 101. In a portion of the cutout section 321, the film antenna 121 is in an exposed state from the front panel 101. The film antenna 121 exposed through the cutout section 321 is configured to be in contact with a portion of the contact portion 311.

The contact portion 311 may be formed to have a material which enables the film antenna 121 and the communication infrastructure 202 (control unit 179) to be electrically connected to each other. In addition, a shape of the contact portion 311 may be a plate shape or a rod shape. Furthermore, the contact portion 311 may be configured to have a plate having a thickness to some extent, and one surface of the plate may be configured to come into surface contact with the film antenna 121.

In addition, as illustrated in FIG. 12, a selection portion which is opposite to the side where the contact portion 311 is connected to the communication infrastructure 202 is configured to be a U-shape. In addition, instead of the U-shape, an L-shape may be employed. Any shape may be employed as long as the shape can maintain a state of being reliably in contact with the film antenna 121. In addition, as long as it is configured so that a connector or a contact point of the contact portion can come into contact with the film antenna 121, any shape may be employed as the shape of the contact portion 311.

The film antenna 121 can be included in the front panel 101 by using a method such as insert molding or two-color molding during the manufacturing of the front panel 101. According to this configuration, it is possible to perform the further optimized measure such as downsizing in a component configuration. In addition, it is possible to reduce labor and time during the manufacturing.

Figure 13:
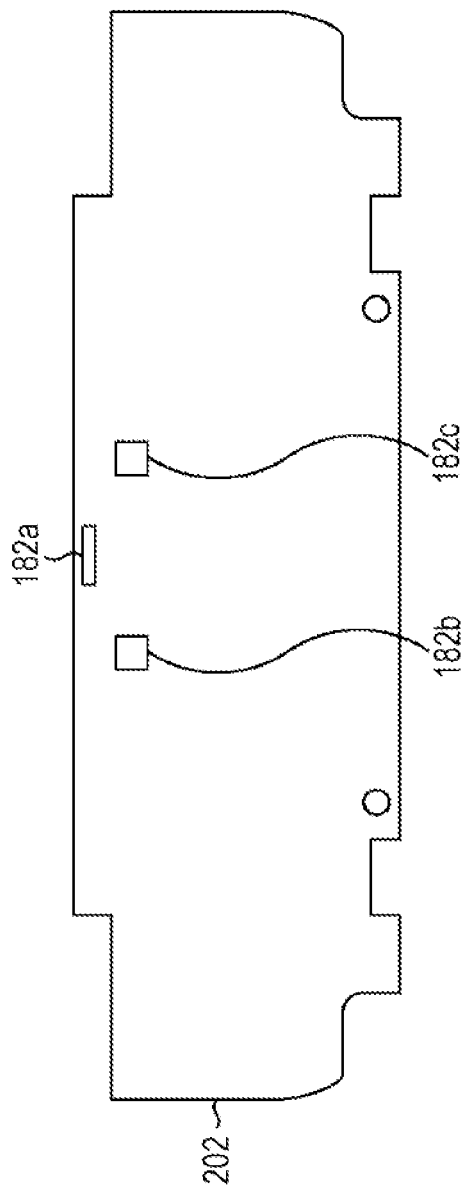
FIG. 13 illustrates an example of a rear surface of a communication board.

Next, FIG. 13 illustrates an example of the rear surface of the communication board 202.

The rear surface of the communication board 202 (surface opposing the bottom surface 221 of the storage case 102) has the LED unit 182a on the upper central side in the drawing, the LED unit 182b on the left lower side from the LED unit 182a in the drawing, and the LED unit 182c on the right lower side from the LED 182b in the drawing, as the LED indicator 182.

Figure 14:
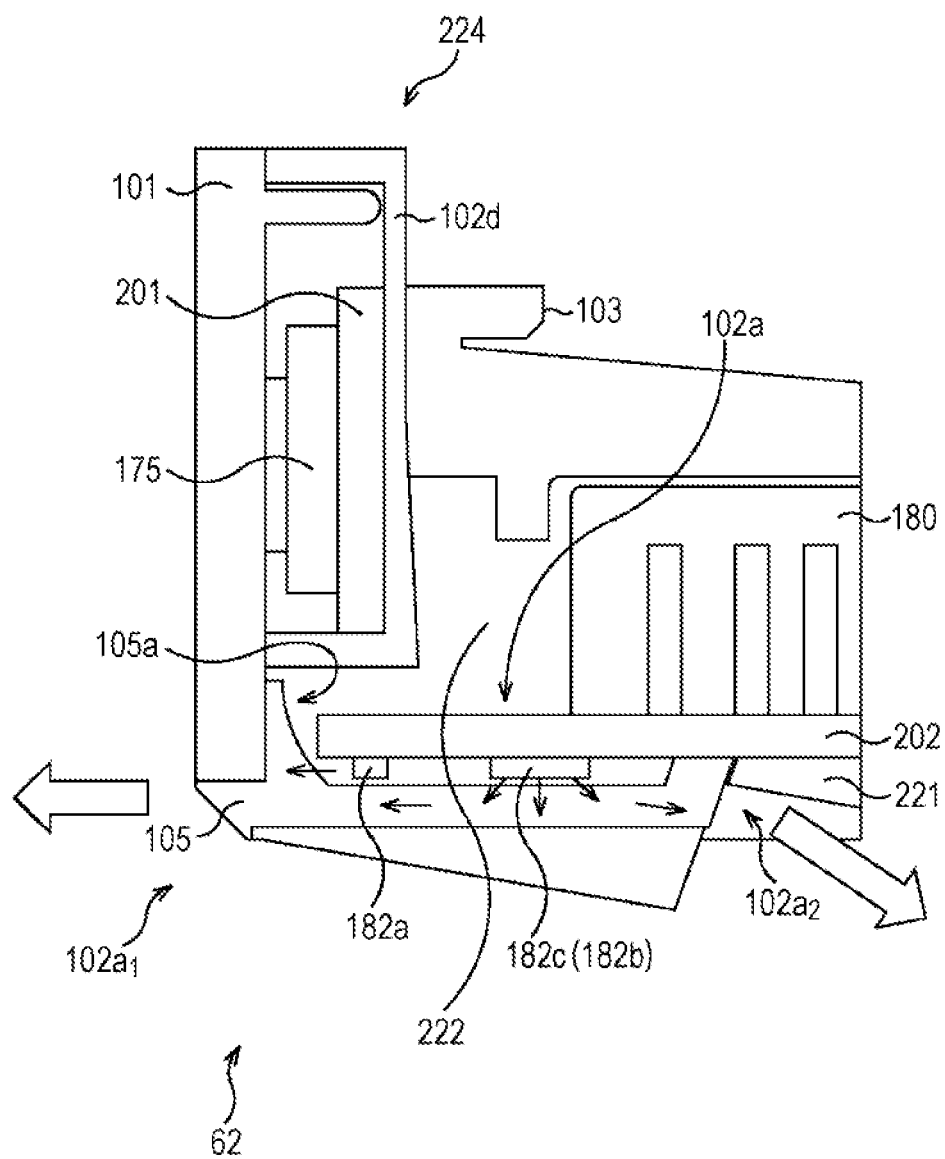
FIG. 14 is a side view illustrating an example of an internal configuration when the smart unit is laterally viewed.

FIG. 14 illustrates an example of an internal configuration when the smart unit 62 is laterally viewed.

In FIG. 14, arrows illustrated near the LED units 182a to 182c and the light guide plate 105 represent light progressing directions. In addition, in FIG. 14, bold arrows represent light leaking directions respectively from the openings 102a1 and 102a2.

As illustrated in FIG. 14, the rear surface of the communication board 202 is arranged to oppose the concave surface 105a of the light guide plate 105 stored in the through hole 102a.

For example, the LED unit 182a emits the white light in the leftward direction in the drawing. That is, for example, the LED unit 182a is configured to have a right angle type LED arranged on the rear surface of the communication board 202 so that a surface of the communication board 202 (horizontal direction in the drawing) is coincident with an optical axis of the LED and a light emitting surface of the LED is directed in the leftward direction in the drawing. The LED unit 182a emits the light in the leftward direction in the drawing.

The LED unit 182b emits the light in the downward direction in the drawing. That is, for example, the LED unit 182b is configured to have a top entry type LED arranged on the rear surface of the communication board 202 so that a normal direction to the surface of the communication board 202 (vertical direction in the drawing) is coincident with the optical axis of the LED and the light emitting surface of the LED is directed in the downward direction in the drawing. The LED unit 182b emits the light having an angle wider than that of the LED unit 182a.

In addition, the LED unit 182b has an LED emitting the red light, an LED emitting the green light and an LED emitting the blue light, as the top entry type LED. Therefore, the LED unit 182b is adapted to emit light having various colors, depending on light emitting brightness of the respective LEDs.

Furthermore, the respective LEDs included in the LED unit 182b are adapted to have an angle wider than that of the LEDs included in the LED unit 182a, and thus emit the light in a range wider than that of the LEDs included in the LED unit 182a. The LED unit 182c is configured similarly to the LED unit 182b.

The light guide plate 105 is stored in the storage case 102 so as to close the opening 102a1 disposed on the front surface 224 of the storage case 102 and the opening 102a2 disposed on the bottom surface 221 of the storage case 102.

In addition, the light guide plate 105 has the concave surface 105a formed to surround the LED unit 182a, the LED unit 182b and the LED unit 182c which are disposed on the rear surface of the communication board 202.

Furthermore, for example, the light guide plate 105 is configured to have a member such as a transparent plastic material which transmits the light, and guides the light to the opening 102a1 by causing the concave surface 105a to receive and diffuse the light emitted from the LED unit 182a. In addition, for example, the light guide plate 105 guides the light to the opening 102a1 and the opening 102a2 by causing the concave surface 105a to receive and diffuse the light emitted from the LED unit 182b and the LED unit 182c.

In this manner, the light emitted from the LED unit 182a, the LED unit 182b and the LED unit 182c is diffused by the light guide plate 105 as in the arrows illustrated on the light guide plate 105 illustrated in FIG. 14, thereby becoming the light (diffused light) which feels soft to humans.

Then, the diffused light which is diffused by the light guide plate 105 is emitted from the opening 102a1 or the opening 102a2 as in the bold arrow illustrated in FIG. 14. A state of the light emitted from the opening 102a1 or the opening 102a2 will be described in detail with reference to FIGS. 18 and 19.

It is desirable to configure the light guide plate 105 to have a transparent member to which a predetermined color is added, without using a colorless and transparent member.

If the light guide plate 105 has a color, the color of the light guide plate 105 can prevent the LED unit 182a, the LED unit 182b and the LED unit 182c (particularly, a portion directly emitting the light) from being visible through the openings 102a1 and 102a2 from outside.

Therefore, for example, as compared to a case of using the light guide plate 105 formed to have the colorless and transparent member, it is possible to more beautifully display the light emitted from the openings 102a1 and 102a2 when the lighting is turned on.

Figure 15:
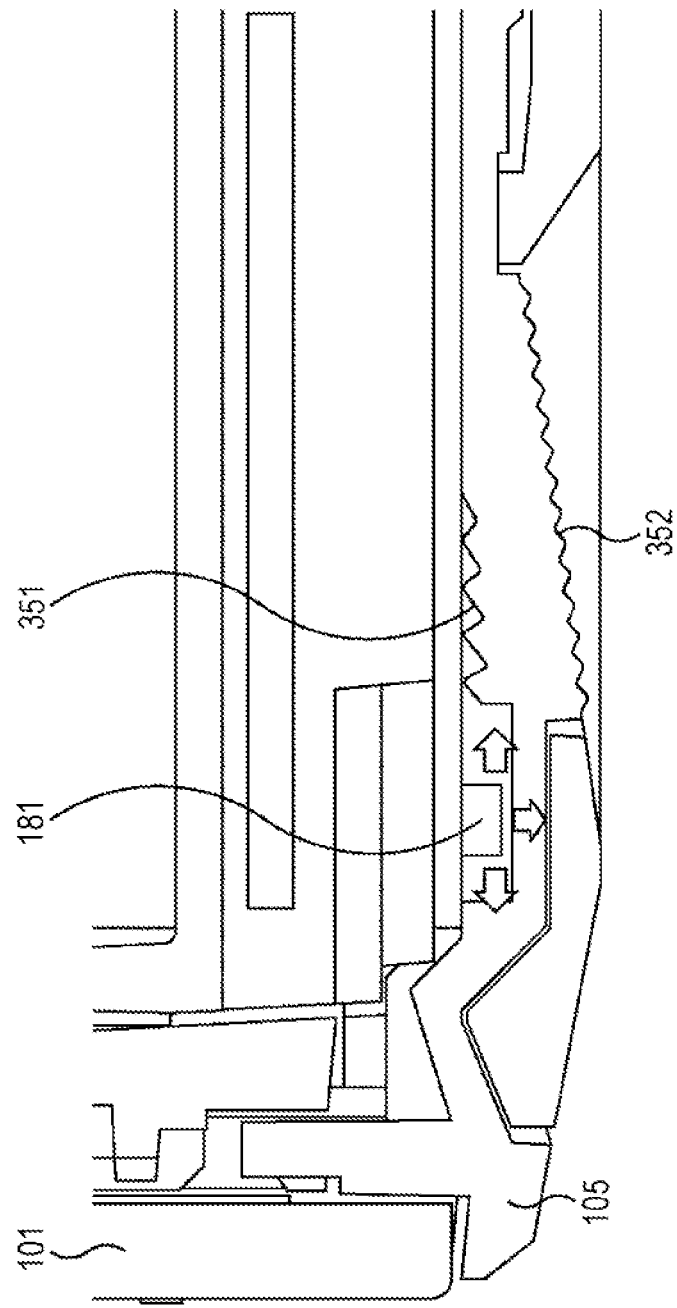
FIG. 15 is a side view illustrating an example of an internal configuration when the smart unit is laterally viewed.

FIG. 15 illustrates an example of another configuration of the light guide plate 105 to allow the light emitted from the LED indicator 182 to be softer light. The upper surface and the lower surface of the light guide plate 105 have a machined surface 351 and a machined surface 352 which respectively have a waveform. The light guide plate 105 is partially subjected to knurling.

The machined surface 351 is disposed on the upper surface in the rear of the LED indicator 182 (opposite side to the front panel 101) within the light guide plate 105. The machined surface 352 is disposed on the lower surface in the rear of the LED 182 (opposite side to the front panel 101) within the light guide plate 105.

Figure 16:
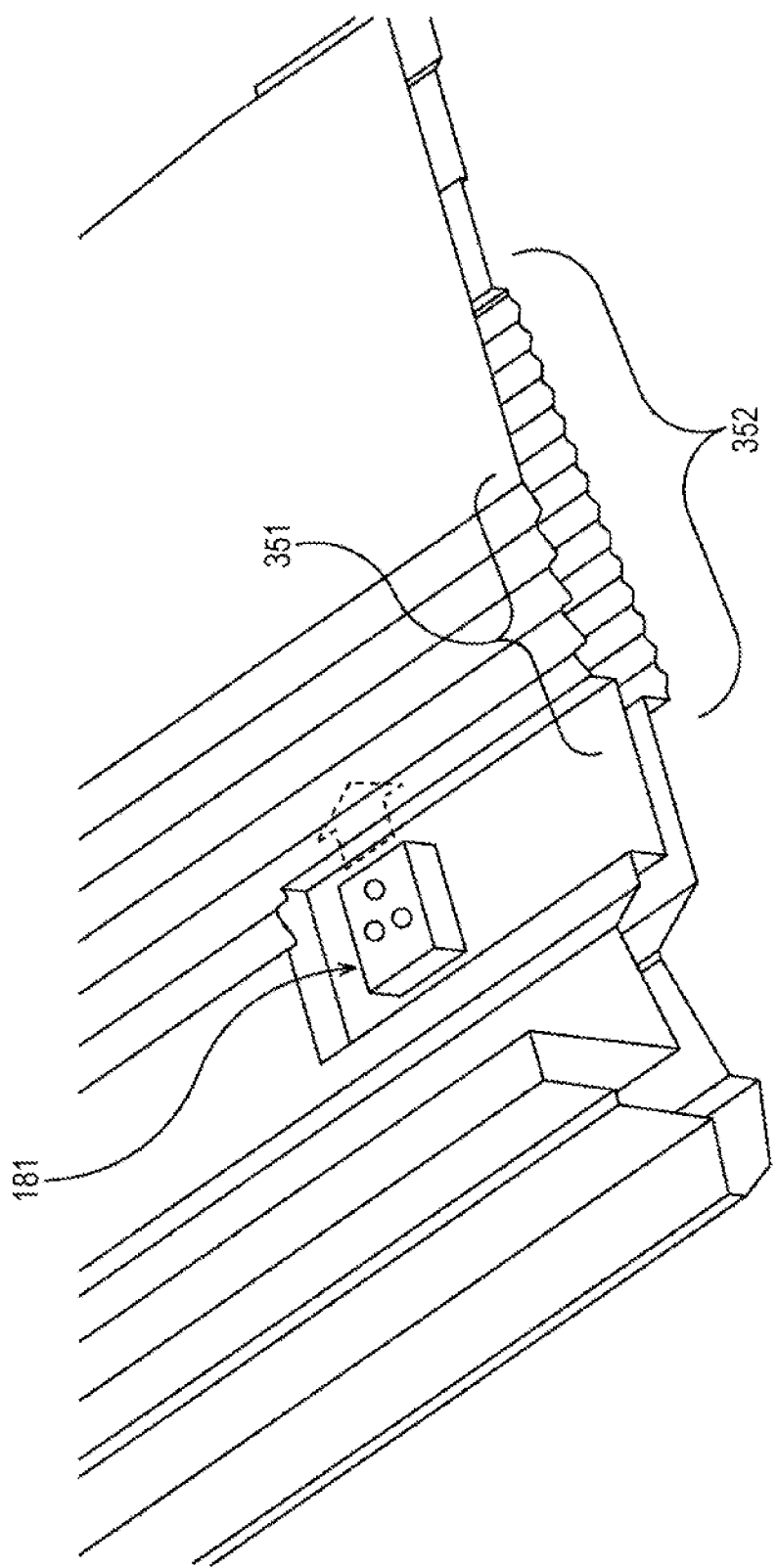
FIG. 16 is a view for describing a machined surface.

Referring to FIGS. 15 and 16, the machined surface 351 is disposed in a range smaller than that of the machined surface 352. In addition, the waveform of the machined surface 351 is larger than the waveform of the machined surface 352. In other words, whereas the waveform of the machined surface 351 is configured so that a height difference between a peak portion and a valley portion is large and a width of one wave is wide, the waveform of the machined surface 352 is configured so that a height difference between a peak portion and a valley portion is small and a width of one wave is narrow.

Figure 17:
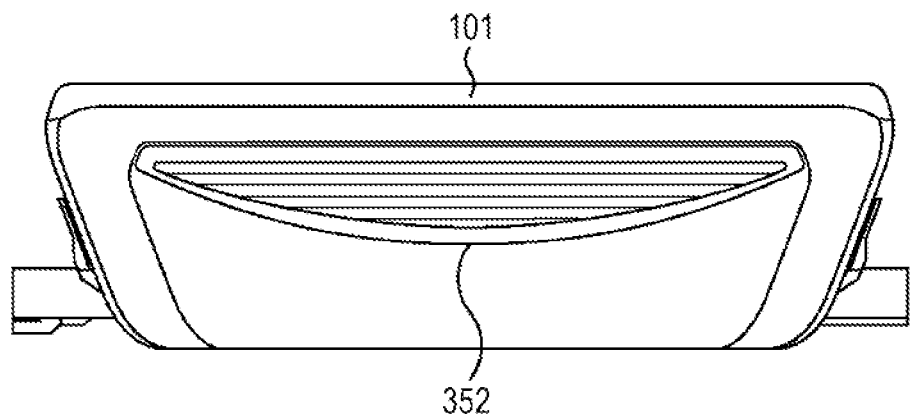
FIG. 17 is a perspective view when the smart unit is viewed from below.

FIG. 17 is a perspective view when the smart unit 62 is viewed from below. The machined surface 352 is disposed on the lower surface off the smart unit 62 illustrated in FIG. 17. The machined surface 352 is configured to have a transparent member (semi-transparent member), and is configured to have a member which transmits the light.

In this configuration, the light emitted from the LED indicator 182 is directly emitted outward from the smart unit 62 via the machined surface 352, is indirectly reflected on the machined surface 351, and is emitted outward to the smart unit 62 via the machined surface 352.

The machined surface 351 is disposed so as to be capable of displaying the soft light by diffusing the light emitted from the LED indicator 182. If a degree of the light diffused by the machined surface 351 is too strong, the light is not emitted in a wide range. Accordingly, the waves of the machined surface 351 are configured to be coarse in the above-described manner, thereby weakening the diffusion.

The machined surface 352 is also disposed so as to be capable of presenting the soft light by diffusing the light emitted from the LED indicator 182. However, the waves are configured to be coarser than that of the machined surface 351. It is possible to uniformize the diffusion degrees by minutely setting the waves of the machined surface 352.

In this manner, the light guide plate 105 has two of the machined surface 351 and the machined surface 5352, and the respective machined surfaces are adapted to have the waveform. Accordingly, the light emitted outward from the smart unit 62 can be made to feel soft. In addition, by causing the waveforms of two of the machined surface 351 and the machined surface 352 to be different from each other, it is possible to adjust a degree of the soft impression on the light or light intensity.

In addition, the machined surface 351 and the machined surface 352 which have the waveform diffuse the light emitted from the LED indicator 182, thereby enabling the light emitted from the LED indicator 182 to be blended. That is, for example, as described by referring to FIG. 13, the LED indicator 182 is configured to have the LED units 182a, 182b and 183c. Thus, it is possible to assign the LED units to respectively emit the red (R) light, the green (G) light and the blue (B) light.

The red light, the green light and the blue light of the LED indicator 182 can be diffused and mixed by the machined surface 351 and the machined surface 352. It is possible to express more colors by adjusting and matching the light intensity of the respective LED units 182a, 182b and 183c.

The machined surface 352 is disposed on the lower surface of the front panel 101, and is disposed to have a member different from that of the front panel 101. The machined surface 352 is disposed by being molded so that a portion of the lower surface of the front panel 101 is cut out and the cut-out portion has the waveform by using the transparent member (semi-transparent member).

When this machined surface 352 is configured to have the transparent member and not to have the waveform, the LED indicator 182 or the communication infrastructure 202, for example, which is disposed inside the front panel 101, is visible to a user. There also exists the design allowing the internal configuration of the communication infrastructure 202 or the like to be visible to the user. However, when the internal configuration is not intended to be visible to the user instead of the above-described design, it is advantageous to configure the machined surface 352 to have the waveform.

That is, since the machined surface 352 has the waveform, it is possible to prevent the internal configuration of the smart unit 62 from being visible through the machined surface 352 formed of the transparent member. In addition, since the waveform of the machined surface 352 is adapted to have the minute wave, it is possible to further enhance an advantageous effect that the interior thereof is not visible. Then, as described above, since the waveform of the machined surface 352 is adapted to have the minute wave, it is also possible to obtain an advantageous effect that the diffused light can be uniformized.

As illustrated in FIG. 17, it is preferable to configure a direction of the waveform of the machined surface 352 to be a direction the same as a longitudinal direction of the smart unit 62 when the smart unit 62 is viewed from below. In other words, it is preferable that the wave of the machined surface 352 be disposed so that a line drawn portion on the machined surface 352 in FIG. 17, which is the peak portion (valley portion) of the machined surface 352, is parallel with the front panel 101.

Since the machined surface 352 is disposed to have the waveform in this manner, it is possible to further enhance the advantageous effect that the wave causes the internal configuration of the smart unit 62 to be unlikely to be visible when viewed from the front panel 101 side.

In this manner, it is possible to diffuse the light by disposing the machined surface 351 and the machined surface 352 in the light guide plate 105, and thus it is possible to obtain a higher design quality. The machined surface 352 is configured to have the transparent (semi-transparent) member. However, the machined surface 351 may be configured to have the member which can diffuse the light, and is not necessarily configured to have the transparent (semi-transparent) member.

Example of Light Distribution

Figure 18:
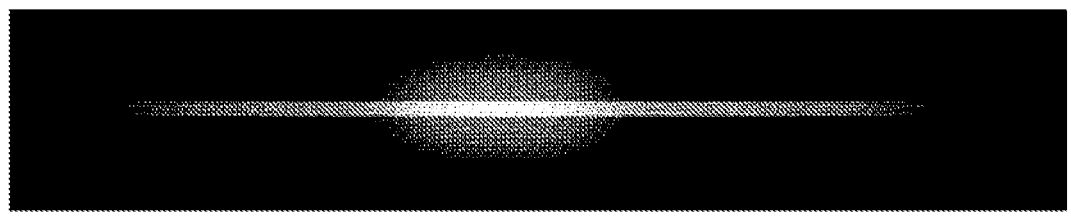
FIG. 18 is a first view illustrating an example of a state of light emitted by the smart unit.

Next, FIG. 18 illustrates an example when the smart unit 62 is viewed from front in a case where the LED unit 182a, the LED unit 182b and the LED unit 182c are turned on.

In order to prevent the drawing from being complicated, FIG. 18 illustrates only the light guide plate 105 which is present on the lower side of the front panel 101.

FIG. 18 illustrates the brightness of the light by using a grayscale. FIG. 18 illustrates that it becomes brighter as it is closer to the white color and it becomes darker as it is closer to the black color. This is the same in FIG. 19 (to be described later).

When the LED unit 182a, the LED unit 182b and the LED unit 182c are turned on, as illustrated in FIG. 18, the light guide plate 105 is a bright in the central portion in the drawing, and becomes dark as if the brightness vanishes as it goes from the central portion in the drawing to the rightward and leftward directions in the drawing.

That is, for example, as illustrated in FIGS. 13 and 14, the LED 182a is disposed in the front panel 101 side rather than the LED unit 182b and the LED unit 182c.

Therefore, as illustrated in the center of FIG. 18, the light emitted from the LED unit 182a closest to the front panel 101 side is seemingly the brightest.

In addition, for example, as illustrated in FIG. 13, the LED unit 182a, the LED unit 182b and the LED unit 182c are disposed in the central portion of the communication board 202.

Therefore, as illustrated in the left side of FIG. 18 and the right side of FIG. 18, the light emitted from the LED unit 182*b* and the LED unit 182*c* becomes dark as if the brightness vanishes as it is away from the center in FIG. 18.

Figure 19:
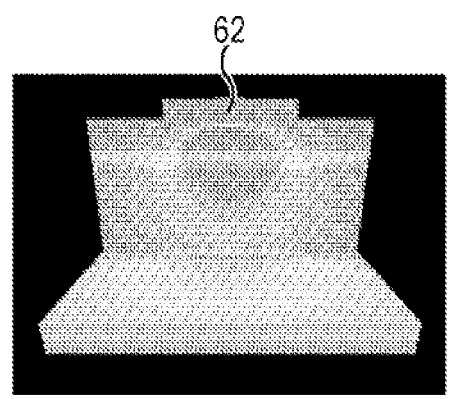
FIG. 19 is a second view illustrating an example of a state of light emitted by the smart unit.

Next, FIG. 19 illustrates an example when the display body 61 and the smart unit 62 are detached from the stand 63 and are used as the television receiver 41 for wall mounting.

FIG. 19 illustrates the smart unit 62 and only an interior (wall and floor portions) in which the smart unit 62 is arranged.

As illustrated in FIG. 19, in the wall on which the smart unit 62 is arranged, circular light is emitted to the lower side of the smart unit 62.

This is due to the fact that the opening 102*a*2 having a crescent shape as illustrated in FIG. 5 is disposed on the bottom surface 221 of the storage case 102.

The brightness distribution of the light emitted from the smart unit 62 is made as described with reference to FIGS. 18 and 19. Accordingly, it is possible to express the soft light as if the light surrounds the smart unit 62.

When the display body 61 to which the smart unit 62 is added is attached to the stand 63, the stand 63 functions as the wall on which the light is reflected. Similarly to the case of the television receiver 41 for wall mounting, the soft light is emitted as if the light surrounds the smart unit 62.

Figure 20:
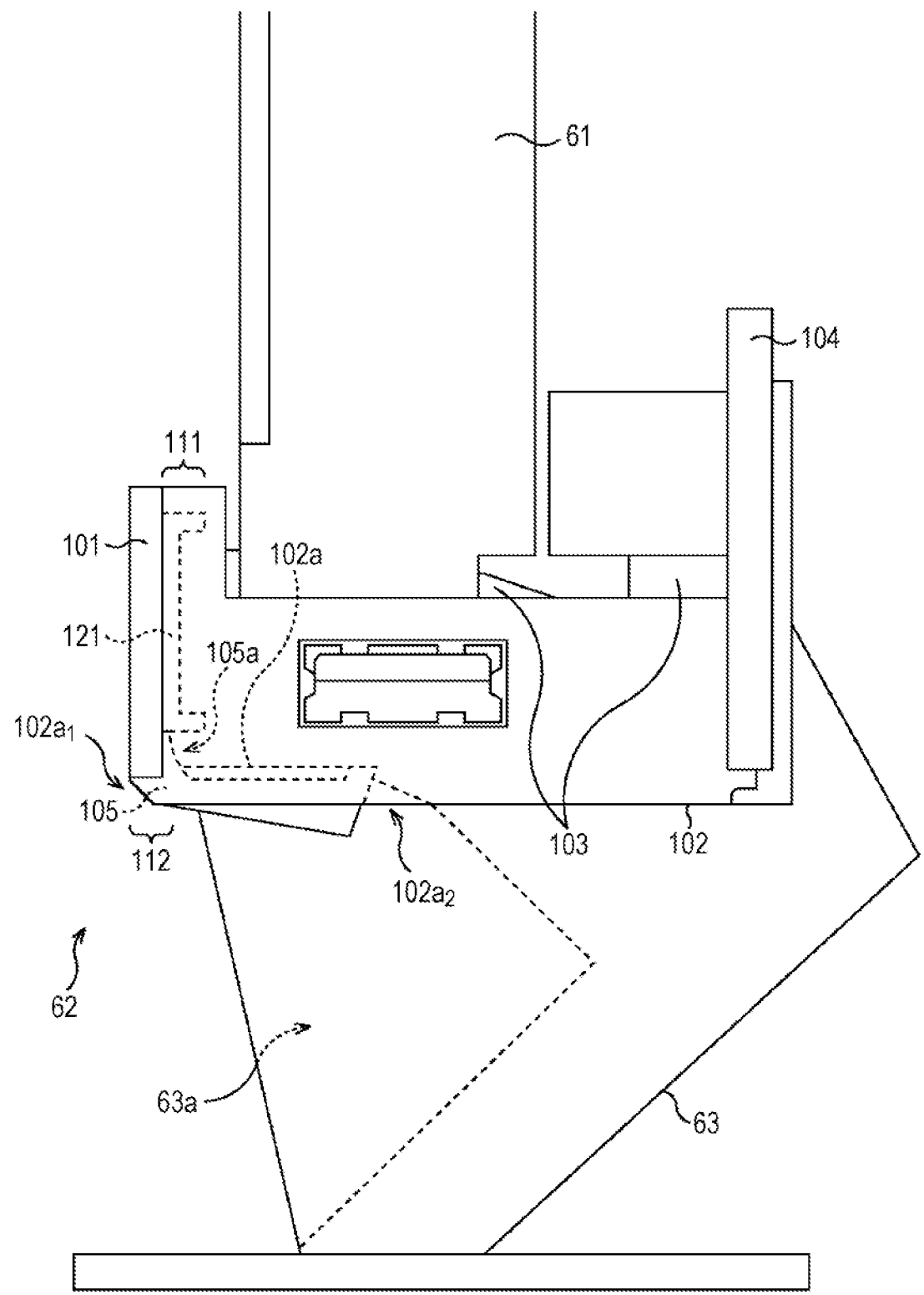
FIG. 20 is a side view of a display body supported by a stand.

That is, for example, as illustrated in FIG. 20, a concave surface 63*a* representing a recessed surface is disposed in the stand 63. In this manner, the light emitted from the opening 102*a*2 of the smart unit 62 may be reflected on the concave surface 63*a*.

Since the concave surface 63*a* functions as the wall used in wall mounting, the light is expressed as if the light surrounds the smart unit 62. A shape of the concave surface 63*a* disposed in the stand 63 may be a shape such as a triangular pyramid and a quadrangular pyramid, or a shape such as a rectangular parallelepiped.

That is, the light emitted from the opening 102*a*2 of the smart unit 62 is reflected on the concave surface 63*a* formed in the stand 63 and is emitted in a front surface direction (leftward direction in the drawing in FIG. 20). In this manner, it is possible to express the light similar to the light when the television receiver 41 is used in the wall mounting.

In addition, in order to improve reception sensitivity for the wireless signal in the smart unit 62, the concave surface 63*a* of the stand 63 may employ a shape which allows the wireless signal to be reflected on the stand 63 and to be directed toward the smart unit 62 (for example, a recessed shape such as a shape of a parabolic antenna).

Incidentally, as described above, the case where the smart unit 62 has the built-in film antenna 121 has been described. However, a configuration may be made where a different type antenna from the film antenna 121 is built therein.

That is, as long as the antenna is stored on the front surface 224 which is the protruding section of the storage case 102 in the smart unit 62, any type of antenna may be built therein.

Here, an example has been described where the antenna is stored on the front surface 224 which is the protruding section of the storage case 102 in the smart unit 62. However, as described below, the arrangement position of the antenna is not limited to the front surface 224, and may be within the smart unit 62.

Example When Using Another Antenna

Figure 21:
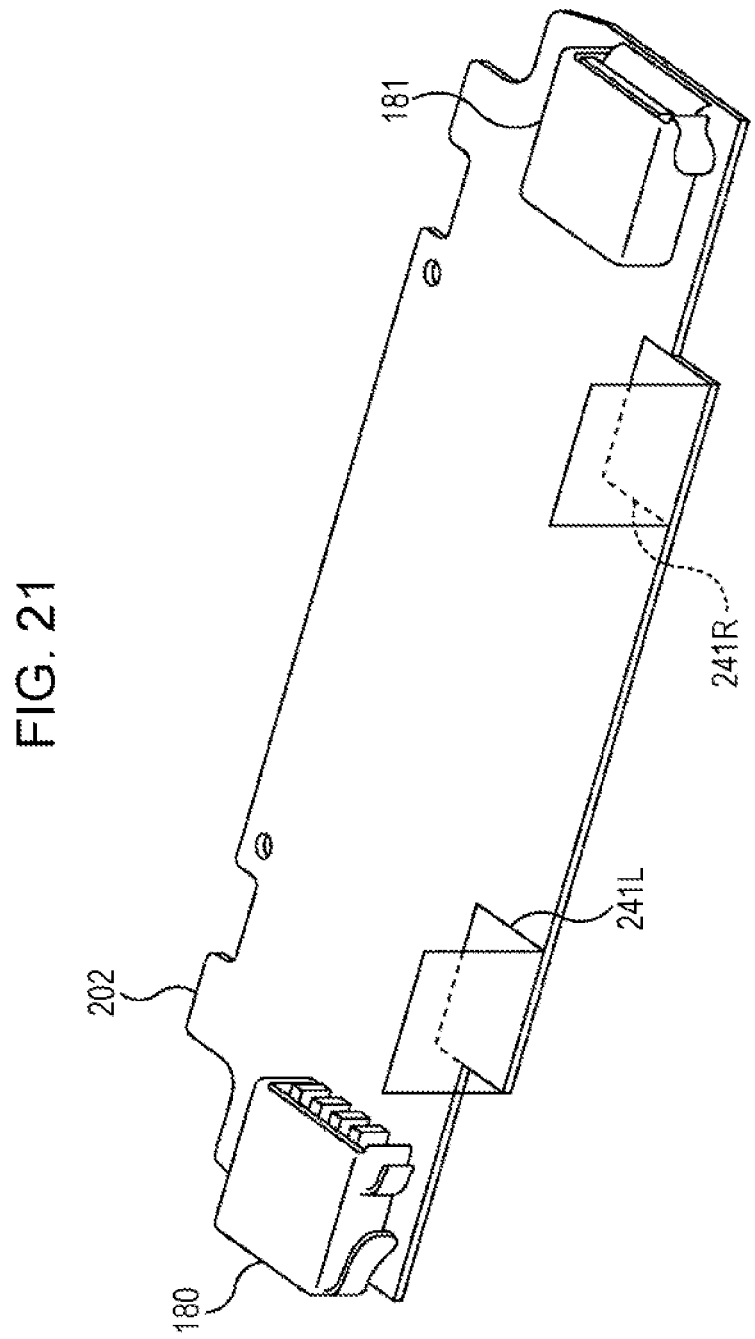
FIG. 21 illustrates an example of the communication board having a metal sheet antenna.

Next, FIG. 21 illustrates an example of the communication board 202 in which a metal sheet antenna is disposed.

As illustrated in FIG. 21, the surface of the communication board 202 has the metal sheet antennae 241L and 241R which are formed in an L-shape and have a metal sheet.

Figure 22:
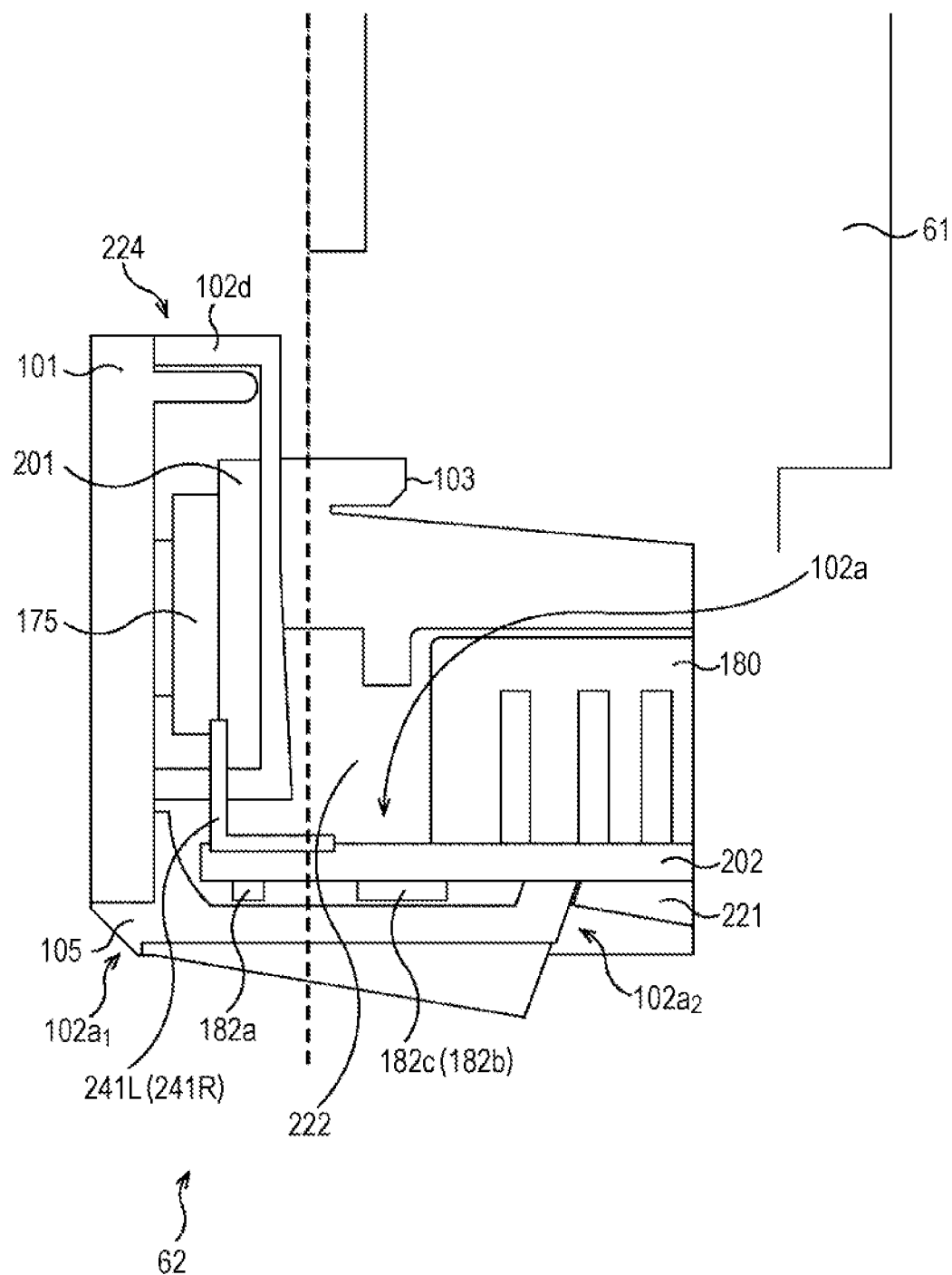
FIG. 22 is a side view of an interior when the smart unit having the built-in communication board of FIG. 20 is laterally viewed.

FIG. 22 illustrates an example of an internal configuration when the smart unit 62 having the built-in communication board 202 of FIG. 21 is laterally viewed.

In FIG. 22, in order to prevent the drawing from being complicated, a portion of the rear surface side (side on which the rear cover 104 is present) of the smart unit 62 is omitted in the illustration.

In FIG. 22, the metal sheet antennae 241L and 241R are arranged in front of the front surface of the display body 61 (further left side from a dashed line illustrated in FIG. 22), on the surface of the communication board 202.

In addition, the camera board 201 is also similarly arranged in front of the front surface of the display body 61. That is, similar to the metal sheet antennae 241L and 241R, the brightness sensor 172 and the IR light receiving unit 173 which are disposed on the camera board 201 are also arranged in front of the front surface of the display body 61.

Figure 23:
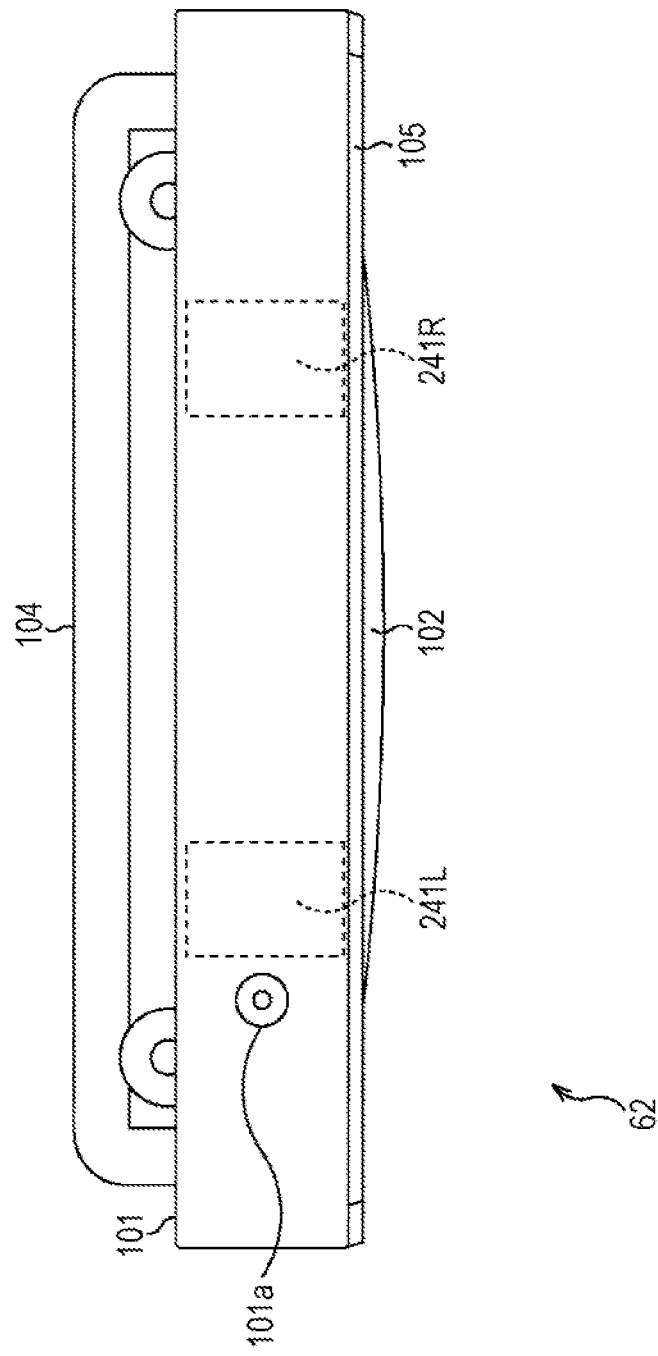
FIG. 23 is a front view of the smart unit having the metal sheet antenna.

Next, FIG. 23 is a front view of the smart unit 62 in which the metal sheet antennae 2411L and 241R are disposed. The metal sheet antennae 241L and 241R are respectively arranged on the rear surface of the front panel 101 as illustrated in FIG. 23.

As described with reference to FIGS. 21 to 23, in the smart unit 62, the metal sheet antennae 241L and 241R and the IR light receiving unit 173 are arranged in front of the front surface of the display body 61.

Therefore, it is possible to prevent a situation where the display body 61 causes degradation in the reception sensitivity for the wireless signal received by the metal sheet antennae 241L and 241R or the operation signal (IR signal) serving as the wireless signal received by the IR light receiving unit 173.

In addition, in the smart unit 62, the brightness sensor 172 is also similarly arranged in front of the front surface of the display body 61. Therefore, the brightness sensor 172 can detect brightness of a place where the user is expected to view the contents such as a broadcasting program displayed on the display screen of the display body 61. This is the same as in a case of employing the film antenna 121.

Figure 24:
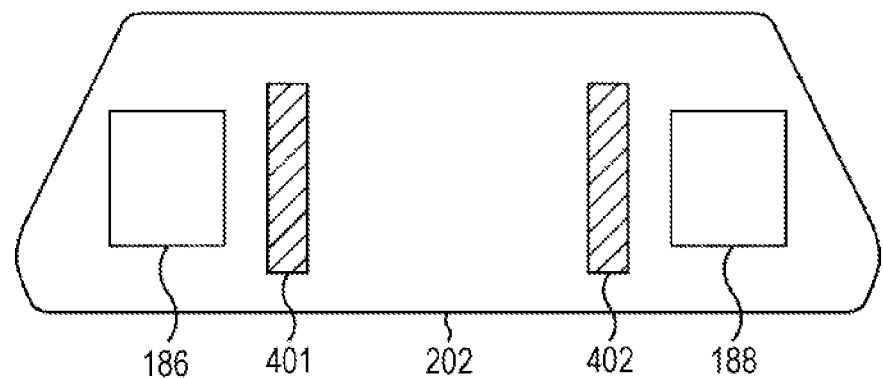
FIG. 24 illustrates another configuration of a communication circuit.

Furthermore, an arrangement position of another antenna will be described. FIG. 24 illustrates a configuration of the communication infrastructure 202 when the BT antenna 186 and the Wi-Fi antenna 188 are disposed in the communication infrastructure 202. The BT antenna 186 and the Wi-Fi antenna 188 are separately arranged as much as possible. This can prevent a situation where interference occurs between the wireless communication using Bluetooth (registered trademark) and the wireless communication using the Wi-Fi.

Furthermore, a gasket 401 and a gasket 402 are disposed in order to prevent the communication interference between the BT antenna 186 and the Wi-Fi antenna 188. The gasket 401 is disposed on the BT antenna 186 side and the gasket 402 is disposed on the Wi-Fi antenna 188 side. The gasket 401 is disposed to prevent the communication transmitted from the BT antenna 186 from leaking out to the Wi-Fi antenna 188 side. The gasket 402 is disposed to prevent the communication transmitted from the Wi-Fi antenna 188 from leaking out to the BT antenna 186 side.

It is possible to dispose another antenna or the control unit 179 (not illustrated in FIG. 24) between the gasket 401 and the gasket 402. The gasket 401 and the gasket 402 may be configured to have the same member or may be configured to have different members. It is preferable to configure the gasket 401 to have a material and a size which can efficiently block the communication transmitted from the BT antenna 186. Similarly, it is preferable to configure the gasket 402 to have a material and a size which can efficiently block the communication transmitted from the Wi-Fi antenna 188.

Figure 25:
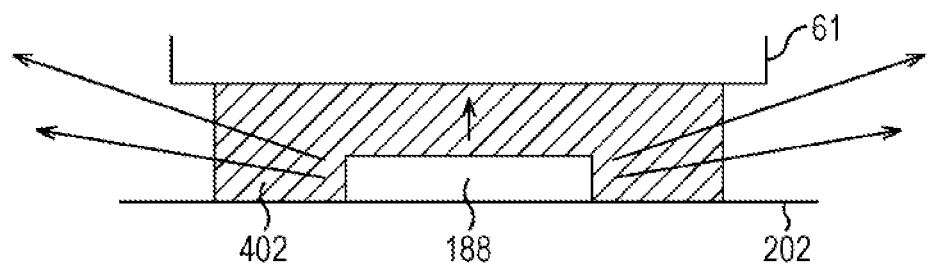
FIG. 25 is a view when the communication circuit is laterally viewed.

FIG. 25 is a view when the communication infrastructure 202 is viewed in the horizontal direction. The arrow in the drawing represents a direction in which the wireless signal is transmitted. FIG. 25 is a view when viewed from the Wi-Fi antenna 188 side disposed on the communication infrastructure 202. Accordingly, the gasket 402 is disposed in a rearward direction in the drawing. The lower surface of the display body 61 is configured to be located at a position in contact with the upper surface of the gasket 402, which is the upper portion of the Wi-Fi antenna 188.

The lower surface of the frame of the display body 61 is generally configured to have a material which is not suitable for good communication, for example, to include a metal or the like. Alternatively, at least the frame of a portion in contact with the frame of the smart unit 62 is configured to include the material which is not suitable for good communication, such as the metal. According to this configuration, it is possible to block the communication (radio wave interference) in an upward direction of the Wi-Fi antenna 188 as illustrated in FIG. 25.

This configuration enables the frame of the display body 61 to block the communication leaking from the Wi-Fi antenna 188 to the BT antenna 186 through the upper portion of the gasket 402. Although not illustrated, similarly, the upper portion of the gasket 401 and the lower surface of the frame of the display body 61 are configured to be in contact with each other. Accordingly, this configuration enables the frame of the display body 61 to block the communication leaking from the BT antenna 186 to the Wi-Fi antenna 188 through the upper portion of the gasket 401.

Referring to FIG. 25, the signal transmitted from the Wi-Fi antenna 188 is blocked by the upper side and the gasket 402 side, but is transmitted outward from the smart unit 62 in the forward direction, in the rearward direction and in the direction opposite to the gasket 402. Although not illustrated, similarly, the signal transmitted from the BT antenna 186 is blocked by the upper side and the gasket 401 side, but is transmitted outward from the smart unit 62 in the forward direction, in the rearward direction and in the direction opposite to the gasket 401.

The configuration of disposing the gaskets in this manner can prevent the situation where the interference occurs between the wireless communication using Bluetooth (registered trademark) and the wireless communication using the Wi-Fi via the BT antenna 186 and the Wi-Fi antenna 188. The communication in a necessary direction can be efficiently performed while preventing the interference. Therefore, there is no possibility of interfering with the communication.

The BT antenna 186 and the Wi-Fi antenna 188 which are disposed in the communication infrastructure 202 may be configured to be a single board integrated with the communication infrastructure 202, or can be configured to have a member connected to the communication infrastructure 202 (state where all are not disposed on the communication infrastructure 202, but a portion is disposed on the communication infrastructure 202). For example, a connector such as a B to B connector may be used and the BT antenna 186 and the Wi-Fi antenna 188 may be disposed so as to be in contact with the communication infrastructure 202. In addition, the BT antenna 186 and the Wi-Fi antenna 188 are not limited to the shape of the film. Whatever shape the antenna has, the present technology can be applied thereto.

Incidentally, in the present embodiment, a case has been described where the smart unit 62 has the functional configuration as illustrated in FIG. 7. However, the functional configuration of the smart unit 62 is not limited thereto.

That is, for example, the smart unit 62 may be configured to have the relay unit 171, the brightness sensor 172, the IR light receiving unit 173, the relay unit 178, the control unit 179, the USB terminal connection part 180, the USB terminal connection part 181 and the LED indicator 182.

In addition, for example, in the smart unit 62, a new functional block (for example, a new camera or the like) may be disposed in the configuration as illustrated in FIG. 7. Furthermore, for example, a configuration can be made so that the number of any antenna out of the BT antenna 186, the NFC antenna 187 and the Wi-Fi antenna 188 may be one or two for the antenna built in the smart unit 62 in FIG. 7.

The smart unit 62 is adapted to have a size and a shape which vary depending on the number of components built in the housing thereof.

Example of Appearance of Another Television Receiver

FIGS. 26 to 41 illustrate examples of appearances of first to fifth television receivers configured to have a smart unit, a display body and a stand.

Figure 26:
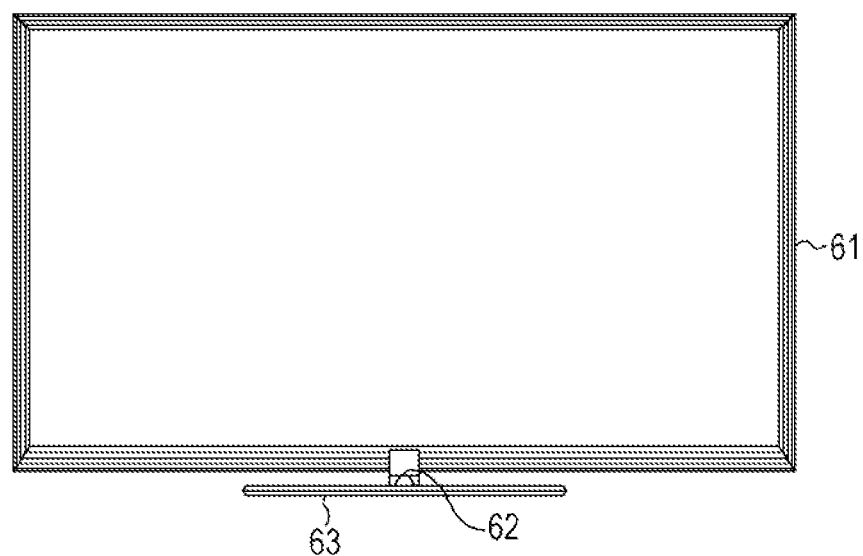
FIG. 26 is a front view of a first television receiver.
Figure 27:
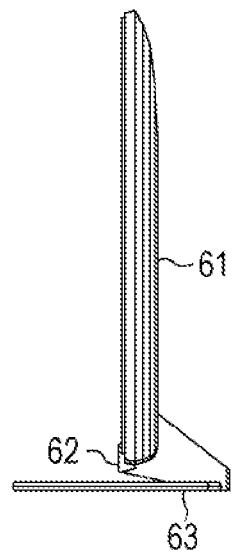
FIG. 27 is a side view of the first television receiver.
Figure 28:
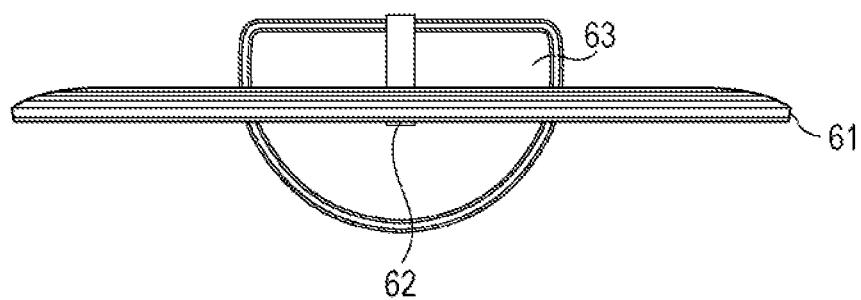
FIG. 28 is a top view of the first television receiver.

That is, FIG. 26 is a front view of the first television receiver when a surface having a display is viewed from front, and FIG. 27 is a side view when the first television receiver illustrated in FIG. 26 is viewed from the right side of FIG. 26. In addition, FIG. 28 is a top view when the first television receiver illustrated in FIG. 26 is viewed from above in FIG. 26.

Figure 29:
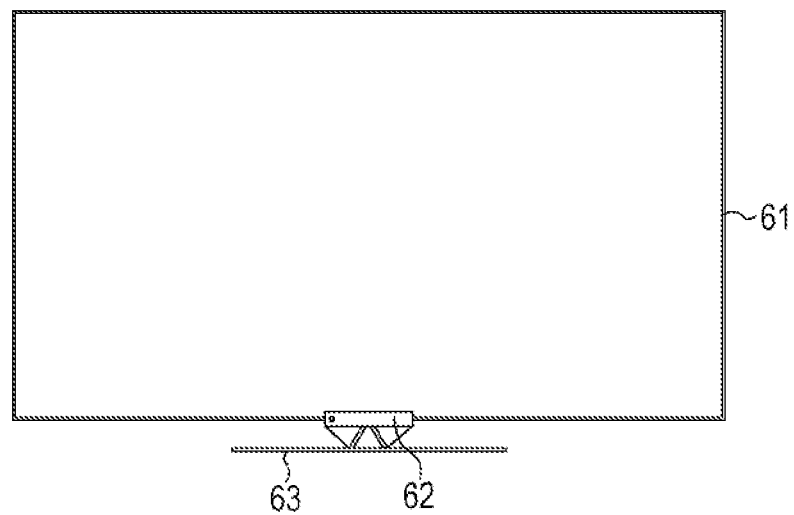
FIG. 29 is a front view of a second television receiver.
Figure 30:
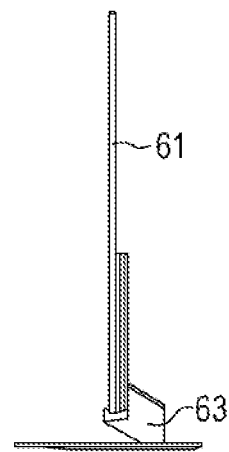
FIG. 30 is a side view of the second television receiver.
Figure 31:
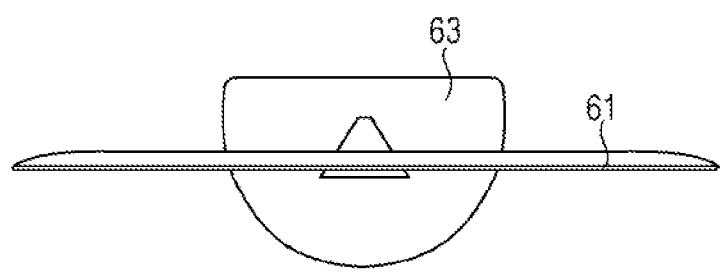
FIG. 31 is a top view of the second television receiver.

FIG. 29 is a front view of the second television receiver when the surface having the display is viewed from front, and FIG. 30 is a side view when the second television receiver illustrated in FIG. 29 is viewed from the right side of FIG. 29. In addition, FIG. 31 is a top view when the second television receiver illustrated in FIG. 29 is viewed from above in FIG. 29.

Figure 32:
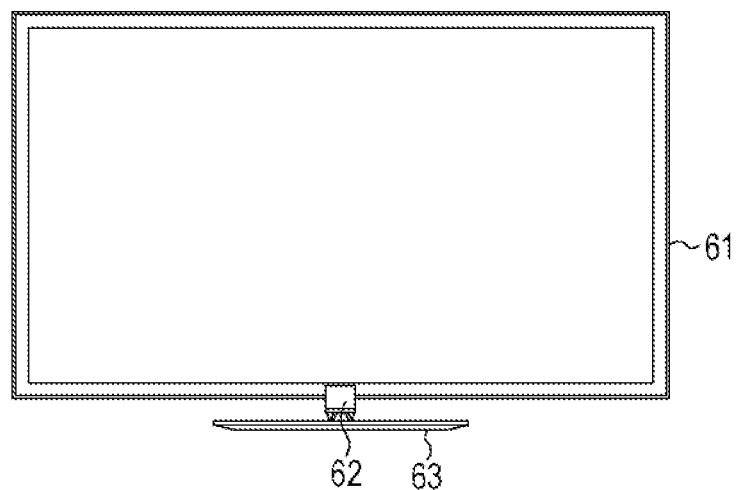
FIG. 32 is a front view of a third television receiver.
Figure 33:
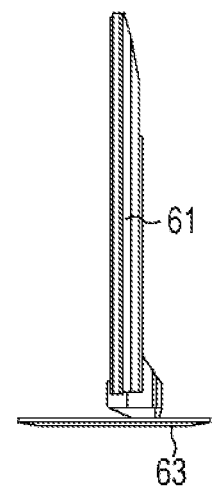
FIG. 33 is a side view of the third television receiver.
Figure 34:
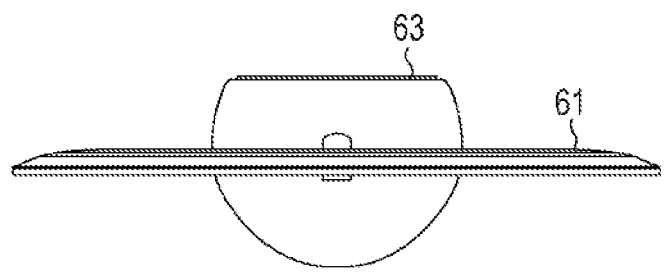
FIG. 34 is a top view of the third television receiver.

FIG. 32 is a front view of the third television receiver when the surface having the display is viewed from front, and FIG. 33 is a side view when the third television receiver illustrated in FIG. 32 is viewed from the right side of FIG. 32. In addition, FIG. 34 is a top view when the third television receiver illustrated in FIG. 32 is viewed from above in FIG. 32.

Figure 35:
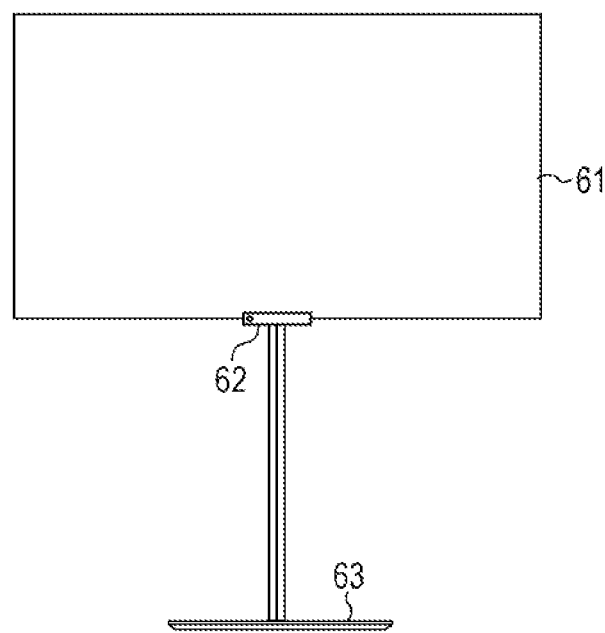
FIG. 35 is a front view of a fourth television receiver.
Figure 36:
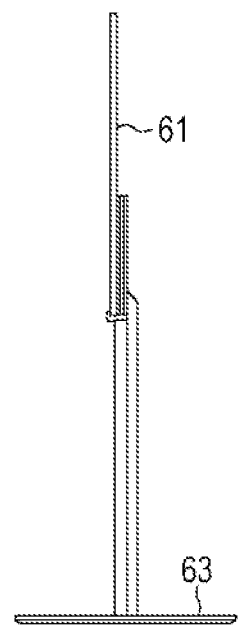
FIG. 36 is a side view of the fourth television receiver.
Figure 37:
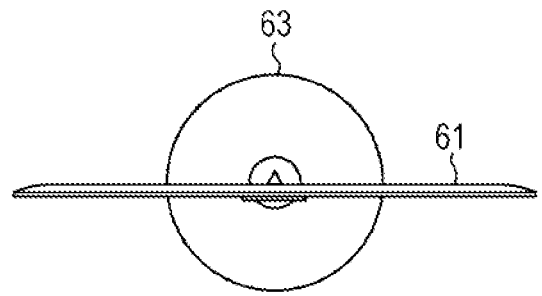
FIG. 37 is a top view of the fourth television receiver.

FIG. 35 is a front view of the fourth television receiver when the surface having the display is viewed from front, and FIG. 36 is a side view when the fourth television receiver illustrated in FIG. 35 is viewed from the right side of FIG. 35. In addition, FIG. 37 is a top view when the fourth television receiver illustrated in FIG. 35 is viewed from above in FIG. 35.

Figure 38:
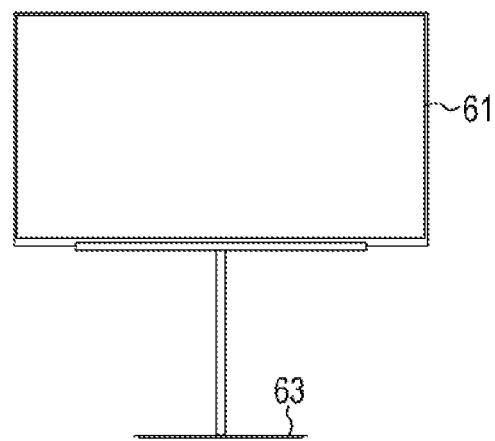
FIG. 38 is a front view of a fifth television receiver.
Figure 39:
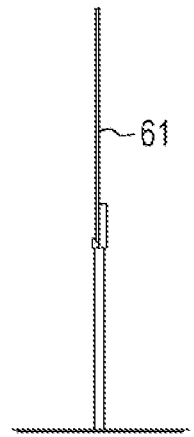
FIG. 39 is a side view of the fifth television receiver.
Figure 40:
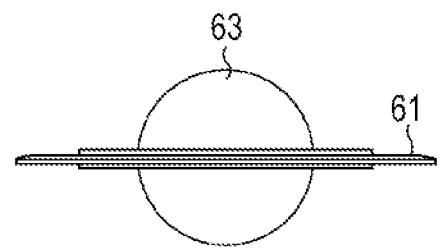
FIG. 40 is a top view of the fifth television receiver.
Figure 41:
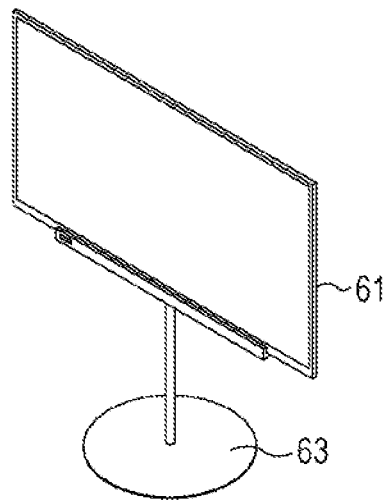
FIG. 41 is a perspective view of the fifth television receiver.

FIG. 38 is a front view of the fifth television receiver when the surface having the display is viewed from front, and FIG. 39 is a side view when the fifth television receiver illustrated in FIG. 38 is viewed from the right side of FIG. 38. In addition, FIG. 40 is a top view when the fifth television receiver illustrated in FIG. 38 is viewed from above in FIG. 38. Furthermore, FIG. 41 is a perspective view when the fifth television receiver illustrated in FIG. 38 is viewed in an oblique direction.

Next, FIGS. 42 to 50 illustrate examples of appearance of sixth to eighth television receivers configured to have a smart unit and a display body.

The sixth to eighth television receivers are used in a television receiver for wall mounting without being supported by a stand.

FIG. 42 is a front view of the sixth television receiver when the surface having the display is viewed from front, and FIG. 43 is a side view when the sixth television receiver illustrated in FIG. 42 is viewed from the right side of FIG. 42. In addition, FIG. 44 is a top view when the sixth television receiver illustrated in FIG. 42 is viewed from above in FIG. 42.

Figure 45:
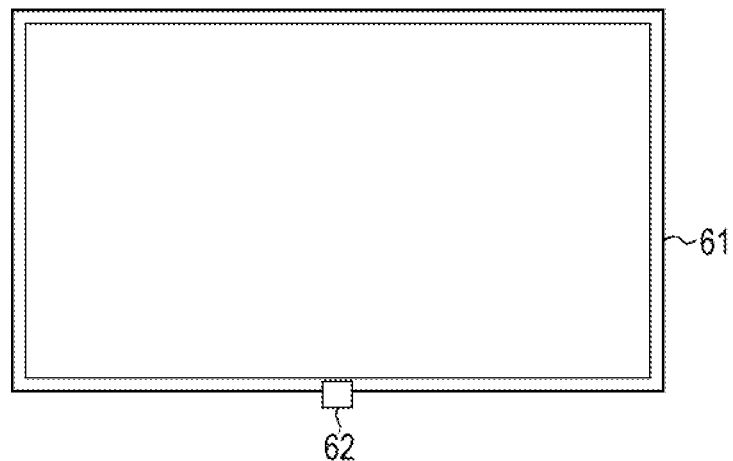
FIG. 45 is a front view of a seventh television receiver.
Figure 46:
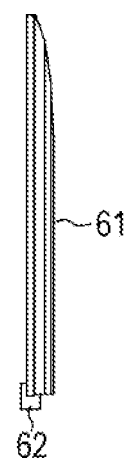
FIG. 46 is a side view of the seventh television receiver.
Figure 47:
FIG. 47 is a top view of the seventh television receiver.

FIG. 45 is a front view of the seventh television receiver when the surface having the display is viewed from front, and FIG. 46 is a side view when the seventh television receiver illustrated in FIG. 45 is viewed from the right side of FIG. 45. In addition, FIG. 47 is a top view when the seventh television receiver illustrated in FIG. 45 is viewed from above in FIG. 45.

Figure 48:
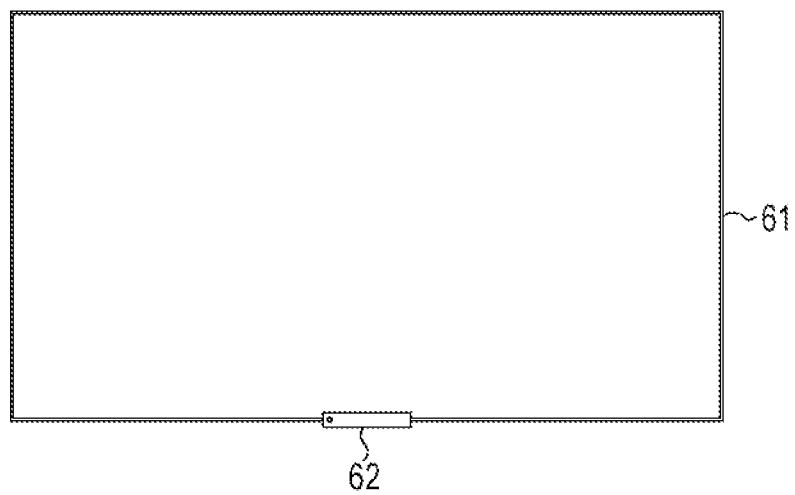
FIG. 48 is a front view of an eighth television receiver.
Figure 49:
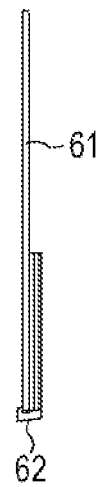
FIG. 49 is a side view of the eighth television receiver.
Figure 50:
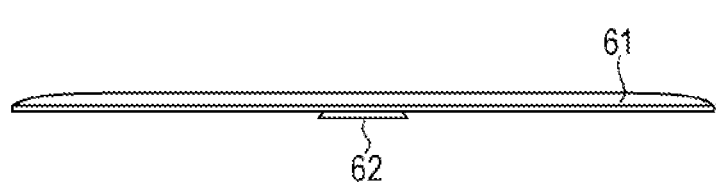
FIG. 50 is a top view of the eighth television receiver.

FIG. 48 is a front view of the eighth television receiver when the surface having the display is viewed from front, and FIG. 49 is a side view when the eighth television receiver illustrated in FIG. 48 is viewed from the right side of FIG. 48. In addition, FIG. 50 is a top view when the eighth television receiver illustrated in FIG. 48 is viewed from above in FIG. 48.

3. Modification Example

In the present embodiment, the smart unit 62 is added to the display body 61 and exchanges data with display body 61 via a signal line.

However, if the smart unit 62 is configured to exchange the data with the display body 61 by the wireless communication for example, it is not necessary that the smart unit 62 be connected to the display body 61. Accordingly, it is possible to arrange the smart unit 62 in a user's desired place. In this case, it is assumed that the smart unit 62 has a built-in battery for supplying power to each unit.

In addition, the smart unit 62 can be configured to image a viewer by using the built-in camera 175 and to recognize the viewer based on a captured image obtained by imaging. In this case, the smart unit 62 supplies the recognition result to the display body 61. The display body 61 can display contents which match preference of the viewer who is recognized based on the recognition result supplied from the smart unit 62.

In addition, for example, the smart unit 62 may be detached from the display body 61 and may be used as a surveillance camera for example. In this case, for example, the smart unit 62 can cause the built-in camera 175 to image the surroundings, and can transmit the captured image obtained by imaging to the display body 61 using the wireless communication so as to display the captured image.

In the smart unit 62, a relatively small display unit may be disposed on the surface of the front panel 101 to display predetermined information on the display unit.

That is, for example, if the display unit disposed on the surface of the front panel 101 is caused to display the predetermined information (for example, current time), a user can easily recognize the predetermined information even when the user views the contents displayed on the display body 61.

Here, as the display unit, in addition to an organic EL display for example, it is possible to employ electronic paper which can display characters or the like even in a de-energized state.

In addition, in the present embodiment, the USB terminal connection parts 180 and 181 are disposed in the smart unit 62.

However, in the smart unit 62, a terminal connection portion of the USB terminal connection parts 180 and 181 can be configured to protrude from the housing of the smart unit 62.

In addition, for example, the terminal connection portion of the USB terminal connection parts 180 and 181 may be caused to protrude from the housing of the smart unit 62, and the protruding section may be configured to be rotatable around the smart unit 62 in a predetermined direction.

Furthermore, for example, in the USB terminal connection parts 180 and 181, a configuration may be made so that the terminal connection portion, to which a signal line which can be extended from the housing of the smart unit 62 by a predetermined length is connected, is drawn out from the inside of the housing. The respective terminal connection portions of the USB terminal connection parts 180 and 181 are connected to the USB terminal connection parts 180 and 181 inside the housing via the connected signal line.

As described above, if the USB terminal connection parts 180 and 181 are included in the configuration, when connecting the USB memory or the like thereto, the terminal connection portions of the USB terminal connection parts 180 and 181 can be taken outward from the housing of the smart unit 62. Therefore, it is possible to easily connect the USB memory or the like thereto.

In the present embodiment, the USB terminal connection parts 180 and 181 are disposed in the smart unit 62. However, in addition, instead of the USB terminal connection parts 180 and 181, for example, a HDMI terminal connection part for connecting a HDMI terminal may be disposed. That is, without being limited to the USB terminal, types of terminals connected to the smart unit 62 may be the HDMI terminal or the like. A configuration may be made so that multiple types of terminals can be connected thereto.

In addition, in the present embodiment, the smart unit 62 is added to the display body 61. However, a target to which the smart unit 62 is added is not limited to the display body 61. For example, the smart unit 62 can be added to a personal computer or the like.

Incidentally, this technology can adopt the following configurations.

(1) A connection device that can be connected to an electronic device includes: a receiving unit that receives a wireless signal transmitted by radio; a relay unit that relays the received wireless signal to the electronic device; a terminal connection part which is connected to a connection terminal; a storage unit that stores the receiving unit, the relay unit and the terminal connection part; and a device connection unit that connects the storage unit to the electronic device. In a state of being connected to the electronic device, in a normal direction to a predetermined housing surface on a housing of the electronic device, the storage unit has a protruding section which protrudes further than the housing surface and stores the receiving unit in the protruding section.

(2) In the connection device described in (1), the storage unit has the protruding section which covers a portion of the housing surface.

(3) The connection device described in (1) or (2) further includes a light emitting unit that emits light based on a control signal transmitted from the electric device. The storage unit stores the light emitting unit.

(4) In the connection device described in (1) to (3), the receiving unit is an antenna for receiving the wireless signal.

(5) In the connection device described in (4), the receiving unit is the antenna formed on a film.

(6) The connection device described in (4) further includes a plate-shaped member having the antenna. The storage unit stores the plate-shaped member in a place where the antenna is stored in the protruding section.

(7) In the connection device described in (1) to (6), the device connection unit is attachable to and detachable from the electronic device.

(8) In the connection device described in (1) to (7), the receiving unit is molded in a state of being included in the protruding section and has a cutout section which exposes the receiving unit in a portion of the protruding section. A connection portion connected to the relay unit is positioned in the cutout section and is in contact with the receiving unit.

(9) In the connection device described in (1), the receiving unit has a plurality of receiving parts receiving different communication, and a blocking unit which blocks radio wave interference is disposed between the plurality of receiving parts.

(10) In the connection device described in (9), an upper surface of the blocking unit is in contact with a portion of the housing of the electronic device.

(11) In the connection device described in (1) to (9), the electronic device is a television receiver having a display unit. In a state of being connected to the television receiver, in a normal direction to the housing surface having the display unit on the housing of the television receiver, the storage unit has the protruding section which protrudes further than the housing surface and stores the receiving unit in the protruding section.

This disclosure is not limited to the above-described embodiments, and can be modified in various ways without departing from the scope of this disclosure.

REFERENCE SIGNS LIST

41 TELEVISION RECEIVER, 61 DISPLAY BODY, 62 SMART UNIT, 63 STAND, 63a CONCAVE SURFACE, 101 FRONT PANEL, 101a EXPOSURE HOLE, 102 STORAGE CASE, 102a THROUGH HOLE, 102a1, 102a2 OPENING, 102b, 102c CYLINDRICAL PORTION, 102d RECESS, 102e HOLE, 102f GROOVE, 103 CONNECTION MEMBER, 104 REAR COVER, 105 LIGHT GUIDE PLATE, 105a CONCAVE SURFACE, 111 RIGHT END PORTION, 112 LOWER END PORTION, 121 FILM ANTENNA, 121a SIGNAL LINE, 171 RELAY UNIT, 172 BRIGHTNESS SENSOR, 173 IR LIGHT RECEIVING UNIT, 174 ENCODER, 175 CAMERA, 176, 177 MICROPHONE, 178 RELAY UNIT, 179 CONTROL UNIT, 180, 181 USB TERMINAL CONNECTION PART, 182 LED INDICATOR, 182a to 182c LED UNIT, 183 TOUCH DETECTION UNIT, 184, 185 DETECTION ELECTRODE, 186 BT ANTENNA, 187 NFC ANTENNA, 188 Wi-Fi ANTENNA, 201 CAMERA BOARD, 202 COMMUNICATION BOARD, 221 BOTTOM SURFACE, 222, 223 SIDE SURFACE, 224 FRONT SURFACE, 241L, 241R METAL SHEET ANTENNA

The invention claimed is:

1. A television receiver comprising:
an electronic device which includes a display unit having a display surface; and
a connection device connectable to the electronic device, the connection device comprising:
a receiving unit configured to (i) receive a wireless signal transmitted by radio and (ii) detect an approaching operation of a user's hand or a touching operation and, based on a detection result therefrom, provide a sensor signal;
a relay unit configured to relay the received wireless signal and the sensor signal to the electronic device;
a light emitting unit configured to emit light based on a control signal transmitted from the electronic device; and
a storage unit that stores the receiving unit and the relay unit, the storage unit including a connecting portion to detachably mount the connection device to or along an external front surface of the electronic device,
wherein the receiving unit includes a film antenna having an antenna portion to receive the wireless signal and a touch detection portion configured to detect the approaching operation or the touching operation.

2. The television receiver according to claim 1, wherein the connection device further comprising:
a terminal connection part which is connected to a connection terminal,
wherein the storage unit stores the terminal connection part.

3. The television receiver according to claim 1, wherein the connecting portion forms a wall area that is used to detachably mount the connection device to the external front surface of the electronic device.

4. The television receiver according to claim 1,
wherein the receiving unit is molded in a state of being included in a protruding section of the storage unit and the protruding section has a cutout section which exposes the receiving unit through a portion of the protruding section, and
wherein a connection section connected to the relay unit is positioned in the cutout section and is in contact with the receiving unit.

5. The television receiver according to claim 1,
wherein the antenna portion of the film antenna of the receiving unit has a plurality of receiving parts receiving different communications, and
wherein a blocking unit which blocks radio wave interference is disposed between the plurality of receiving parts.

6. The television receiver according to claim 5,
wherein an upper surface of the blocking unit is in contact with a portion of a housing of the electronic device.

7. The television receiver of claim 1, wherein the external front surface is formed along an edge of the electronic device.

8. The television receiver of claim 7, wherein the edge comprises a lower edge of the electronic device when assembled and the connecting portion is mountable at a midpoint of the lower edge of the electronic device.

9. A television receiver comprising:
an electronic device which includes a display unit having a display surface; and
a connection device connectable to the electronic device, the connection device comprising:
a receiver for (i) receiving a wireless signal transmitted by radio and (ii) detecting an approaching operation of a user's hand or a touching operation and, based on a detection result therefrom, for providing a sensor signal;
a relay that transmits the received wireless signal and the sensor signal to the electronic device;
a storage case formed on a surface of the connection device and used to store the receiver and the relay; and
a connection member for connecting the storage case to the electronic device so as to enable the connection device to be connected to or along a portion of a front side of the electronic device,
wherein the receiver includes a film antenna having an antenna portion to receive the wireless signal and a touch detection portion configured to detect the approaching operation or the touching operation.

10. A television receiver comprising:
an electronic device which includes a display unit having a display surface; and
a connection device connectable to the electronic device, said connection device comprising:
a receiving device for (i) receiving a wireless signal transmitted and (ii) detecting an approaching operation of a user's hand or a touching operation and, based on a detection result therefrom, for providing a sensor signal;
relay circuitry for relaying the received wireless signal and the sensor signal to the electronic device;
a storage compartment for storing the receiving device, the relay circuitry and the light emitting unit; and
a device connection member for connecting the storage compartment to the electronic device so as to enable the connection device to be connected along a side of the electronic device and to be positioned along a front surface of the electronic device,
wherein the receiving device includes a film antenna having an antenna portion to receive the wireless signal and a touch detection portion configured to detect the approaching operation or the touching operation.

11. The television receiver of claim 10, wherein the film antenna is a Bluetooth antenna.

12. The television receiver of claim 10, wherein the film antenna is a near field communication antenna.

13. The television receiver of claim 10, wherein the film antenna is a Wi-Fi communication antenna.

14. A television receiver comprising:
an electronic device which includes a display having a display surface; and
a connection device configured to exchange data with the electronic device by wireless communication, the connection device comprising:
circuitry configured to:
receive a wireless signal transmitted by radio,
detect an approaching operation of a user's hand or a touching operation, and
transmit the received wireless signal to the electronic device based on a detection result;
wherein the connection device includes a film antenna having an antenna portion to receive the wireless signal and a touch detection portion configured to detect the approaching operation or the touching operation.

15. The television receiver of claim 14, wherein the film antenna is a Bluetooth antenna.

16. The television receiver of claim 14, wherein the film antenna is a near field communication antenna.

17. The television receiver of claim 14, wherein the film antenna is a Wi-Fi communication antenna.

18. The television receiver of claim 14, further comprises a smart unit that includes a camera.

19. The television receiver of claim 14, further comprises a light emitting unit configured to emit light based on a control signal transmitted from the electronic device.

20. The television receiver of claim 14, further comprises a smart unit that includes a relay unit configured to relay the received wireless signal.

* * * * *